(12) United States Patent
Horiuchi et al.

(10) Patent No.: US 11,646,841 B2
(45) Date of Patent: *May 9, 2023

(54) BASE STATION, TERMINAL, TRANSMISSION METHOD, AND RECEPTION METHOD FOR USING PDCCH (PHYSICAL DOWNLINK CONTROL CHANNEL) TO INDICATE RESOURCE ASSIGNMENT FOR PDSCH (PHYSICAL DOWNLINK SHARED CHANNEL)

(71) Applicant: Panasonic Intellectual Property Corporation of America, Torrance, CA (US)

(72) Inventors: Ayako Horiuchi, Kanagawa (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 168 days.

This patent is subject to a terminal disclaimer.

(21) Appl. No.: 17/143,873

(22) Filed: Jan. 7, 2021

(65) Prior Publication Data
US 2021/0126756 A1   Apr. 29, 2021

Related U.S. Application Data

(63) Continuation of application No. 16/428,090, filed on May 31, 2019, now Pat. No. 10,924,238, which is a (Continued)

(30) Foreign Application Priority Data

Aug. 7, 2015 (JP) .............................. JP2015-156998

(51) Int. Cl.
*H04L 12/28* (2006.01)
*H04L 5/00* (2006.01)
(Continued)

(52) U.S. Cl.
CPC .......... *H04L 5/0048* (2013.01); *H04L 5/0007* (2013.01); *H04L 5/0044* (2013.01);
(Continued)

(58) Field of Classification Search
CPC ...... H04L 1/1614; H04L 5/0053; H04W 4/70; H04W 72/0453; H04W 72/1278; H04W 72/1289
(Continued)

(56) References Cited

U.S. PATENT DOCUMENTS

2012/0044921 A1    2/2012   Chung et al.
2013/0083753 A1    4/2013   Lee et al.
(Continued)

OTHER PUBLICATIONS

3GPP TR 36.888 V12.0.0, "3rd Generation Partnership Project; Technical Specification Group Radio Access Network; Study on provision of low-cost Machine-Type Communications (MTC) User Equipments (UEs) based on LTE", Jun. 26, 2013.
(Continued)

*Primary Examiner* — John Pezzlo
(74) *Attorney, Agent, or Firm* — Seed IP Law Group LLP

(57) ABSTRACT

A resource assignment determiner determines a resource for a PDSCH intended for an MTC terminal, and a transmitter transmits an MPDCCH that includes resource assignment bits indicating the resource thus determined and transmits the PDSCH using the resource thus determined. The MPDCCH is a PDCCH intended for the MTC terminal. The resource assignment bits are associated with a resource that is used when the MPDCCH and the PDSCH are transmitted in the same subframe and a resource that is used when the MPDCCH and the PDSCH are transmitted in different subframes.

18 Claims, 24 Drawing Sheets

Related U.S. Application Data continuation of application No. 15/811,153, filed on Nov. 13, 2017, now Pat. No. 10,355,840, which is a continuation of application No. PCT/JP2016/003249, filed on Jul. 8, 2016.

(51) Int. Cl.
  *H04W 72/21* (2023.01)
  *H04W 72/23* (2023.01)
  *H04W 72/0446* (2023.01)
  *H04J 1/16* (2006.01)
  *H04W 4/70* (2018.01)

(52) U.S. Cl.
  CPC ....... *H04L 5/0053* (2013.01); *H04W 72/0446* (2013.01); *H04W 72/21* (2023.01); *H04W 72/23* (2023.01); *H04L 5/0092* (2013.01); *H04W 4/70* (2018.02)

(58) Field of Classification Search
  USPC .......................................... 370/252, 329, 430
  See application file for complete search history.

(56) References Cited

U.S. PATENT DOCUMENTS

| | | | |
|---|---|---|---|
| 2013/0121278 A1* | 5/2013 | Noh | H04L 5/0041 370/329 |
| 2015/0223216 A1* | 8/2015 | Han | H04W 72/044 370/329 |
| 2016/0100395 A1 | 4/2016 | Xu et al. | |
| 2016/0219547 A1* | 7/2016 | Seo | H04L 5/14 |
| 2016/0227538 A1* | 8/2016 | Seo | H04L 5/14 |
| 2017/0019915 A1* | 1/2017 | Nogami | H04L 5/0053 |
| 2017/0055234 A1 | 2/2017 | Seo et al. | |
| 2018/0102890 A1* | 4/2018 | Yi | H04L 5/0053 |
| 2018/0124728 A1 | 5/2018 | Xiong et al. | |
| 2018/0139014 A1 | 5/2018 | Xiong et al. | |
| 2018/0255542 A1 | 9/2018 | Seo et al. | |

OTHER PUBLICATIONS

International Search Report of PCT application No. PCT/JP2016/003249 dated Sep. 20, 2016.

* cited by examiner

| RIV | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| PRB#5 | | | | | | | | | | | | | | | | |
| PRB#4 | | | | | | | | | | | | | | | | |
| PRB#3 | | | | | | | | | | | | | | | | |
| PRB#2 | | | | | | | | | | | | | | | | |
| PRB#1 | | | | | | | | | | | | | | | | |
| PRB#0 | | | | | | | | | | | | | | | | |

FIG. 8

| RIV | 0 | 1 | 2 | 3 |
|---|---|---|---|---|
| PRB#5 | | | | |
| PRB#4 | | | | |
| PRB#3 | | | | |
| PRB#2 | | | | |
| PRB#1 | | | | |
| PRB#0 | | | | |

| RBG size | | | RIV | 0 | 1 | 2 | 3 | 4 | 5 | 6 | 7 |
|---|---|---|---|---|---|---|---|---|---|---|---|
| 2 | 3 | 4 | PRB#5 | | | | | | ▓ | | ▓ |
| | | | PRB#4 | | ▓ | ▓ | | | ▓ | | ▓ |
| | | | PRB#3 | | | ▓ | | | ▓ | ▓ | ▓ |
| | | | PRB#2 | | | | | ▓ | | ▓ | ▓ |
| | | | PRB#1 | | | | ▓ | ▓ | | ▓ | ▓ |
| | | | PRB#0 | ▓ | | | ▓ | ▓ | | ▓ | ▓ |

| Narrowband indication field in DCI | Narrowband position | Scheduled frame with MPDCCH? | Same precoding with MPDCCH? |
|---|---|---|---|
| 0 | same with the last MPDCCH | same subframe | same |
| 1 | same with the last MPDCCH | same subframe | no |
| 2 | same with the last MPDCCH | cross | no |
| 3 | A | cross | no |
| 4 | B | cross | no |
| 5 | C | cross | no |
| 6 | D | cross | no |
| 7 | E | cross | no |

FIG. 28

BASE STATION, TERMINAL, TRANSMISSION METHOD, AND RECEPTION METHOD FOR USING PDCCH (PHYSICAL DOWNLINK CONTROL CHANNEL) TO INDICATE RESOURCE ASSIGNMENT FOR PDSCH (PHYSICAL DOWNLINK SHARED CHANNEL)

BACKGROUND

1. Technical Field

The present disclosure relates to a base station, a terminal, a transmission method, and a reception method.

2. Description of the Related Art

In recent years, Machine-Type Communications (MTC) based on cellular networks have been studied (see, for example, 3GPP TR 36.888 V12.0.0, "Machine-Type Communications (MTC) User Equipments (UEs) based on LTE (Release 12)," June 2013.). Possible applications of MTC include automatic meter reading of smart meters, inventory management, logistics management based on positional information, pet and livestock management, and mobile payment. In MTC, MTC-compatible terminals (MTC terminals) are supposed to be connected to networks. While MTC terminals are placed on a massive scale, it is anticipated that every single MTC terminal will not have that large amount of traffic. For this reason, MTC terminals are required to be low in both cost and power consumption. Further, MTC terminals are required to be wider in coverage, as they may be placed in a basement of a building, where radio waves hardly reach, and similar places.

In LTE-Advanced enhancement standardized by the 3GPP, it has been under consideration that, for reduction of cost of MTC terminals, the resources that an MTC terminal uses for communication are limited to six or less PRBs (physical resource blocks) regardless of system band. In a case where the system band is wider than six PRBs, the MTC terminal performs transmission and reception by receiving only a part of the system band. The PRBs to be used for transmission and reception can be changed by retuning. This resource of six or less PRBs is called "narrowband". It is specified that a narrowband is composed of contiguous PRBs.

Further, it has been under consideration that an MPDCCH (PDCCH for MTC), which is obtained by enhancing an EPDCCH (enhanced physical downlink control channel) for MTC, is used as a control signal for an MTC terminal. An MPDCCH is allocated to a narrowband. The MTC terminal detects a control signal addressed thereto by blind decoding the MPDCCH, receives a DL (downlink) resource assignment or an UL (uplink) resource assignment, and receives DL data or transmits UL data in accordance with the resource assignment.

LTE has three types of assignment methods, namely Type 0, Type 1, and Type 2, as DL resource assignment methods. In each of the assignment methods, the number of bits that are needed for assignment is reduced by imposing restrictions on resource assignment patterns. Therefore, there is no assignment method that fully covers all resource assignment patterns. In Type 0 and Type 1, PRBs are assigned to a terminal by using an RBG size that indicates the number of RBs that constitute one RBG (resource block group). Note here that the RBG size is determined according to the number of RBs that are included in the system band. An RBG is a resource that is obtained by separating, from an end of the band, contiguous PRBs whose number is the same as the RBG size. In Type 0, resources are assigned on an RBG-by-RBG basis. In Type 1, each RBG is composed of a plurality of RBs that belong to any subset. The number of subsets is the same as the RBG size. In Type 1 resource assignment, a subset is selected first, and then a resource is assigned to each of the PRBs in an RBG that belong to the subset thus selected. In Type 2, resources that follow one after the other on a VRB (virtual resource block) are assigned without the use of the definition of an RBG. There are two types of VRB: a distributed VRB that is allocated in a distributed manner in being mapped on a PRB and a localized VRB that is allocated in a localized manner in being mapped on a PRB.

Unlike in the case of the conventional resource assignment to terminals, the resource assignment to MTC terminals that receive narrowbands requires two steps of resource identification, namely identification of a narrowband within the system band and identification of a PRB within the narrowband. Information for identifying these resources is contained in DCI (downlink control information) and expected to be allocated to an MPDCCH. Furthermore, the following two cases of DL assignment to MTC terminals have been under consideration. That is, in one of the cases, an MPDCCH on which a DL resource assigning control signal (DL assignment) that designates a resource assignment is mapped and DL data (PDSCH: physical downlink shared channel; also sometimes referred to as "MPDCCH") that is assigned by the DL resource assigning control signal are allocated to the same subframe (also sometimes referred to as "same-subframe scheduling"). In the other case, the MPDCCH and the DL data are allocated to different subframes (also sometimes referred to as "cross-subframe scheduling").

However, as for these cases, how the information for resource assignment is contained in the DCI has not been carefully considered.

SUMMARY

One non-limiting and exemplary embodiment provides a base station, a terminal, a transmission method, and a reception method that make it possible to, in assigning resources to MTC terminals, use DCI to efficiently notify information for resource assignment.

In one general aspect, the techniques disclosed here feature a base station including: control circuitry that determines a resource for a PDSCH (physical downlink shared channel) intended for an MTC (Machine-Type Communication) terminal; and a transmitter that transmits an MPDCCH that includes resource assignment bits indicating the determined resource and transmits the PDSCH using the determined resource. The MPDCCH being a PDCCH (physical downlink control channel) intended for the MTC terminal. In the base station, the resource assignment bits are associated with a resource that is used when the MPDCCH and the PDSCH are transmitted in a single subframe and a resource that is used when the MPDCCH and the PDSCH are transmitted in different subframes.

An aspect of the present disclosure makes it possible to, in assigning resources to MTC terminals, use DCI to efficiently notify information for resource assignment.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a diagram showing an example of PDSCH resource assignment at the time of cross-subframe scheduling according to Embodiment 1;

FIG. 6 is a diagram showing an example of PDSCH resource assignment at the time of same-subframe scheduling according to Embodiment 1;

FIG. 7 is a diagram showing an example of PDSCH resource assignment at the time of same-subframe scheduling according to a variation of Embodiment 1;

FIG. 8 is a diagram showing an example of PDSCH resource assignment at the time of same-subframe scheduling according to a variation of Embodiment 1;

FIG. 9 is a diagram showing an example of PDSCH resource assignment at the time of cross-subframe scheduling according to a variation of Embodiment 1;

FIG. 10 is a diagram showing an example of PDSCH resource assignment according to Embodiment 2;

FIG. 11 is a diagram showing an example of PDSCH resource assignment at the time of same-subframe scheduling according to a variation of Embodiment 2;

FIG. 12 is a diagram showing an example of PDSCH resource assignment at the time of same-subframe scheduling according to a variation of Embodiment 2;

FIG. 13 is a diagram showing an example of PDSCH resource assignment at the time of same-subframe scheduling according to a variation of Embodiment 2;

FIG. 14 is a diagram showing an example of PDSCH resource assignment at the time of same-subframe scheduling according to a variation of Embodiment 2;

FIG. 15 is a diagram showing an example of 4-bit PDSCH resource assignment at the time of cross-subframe scheduling according to Embodiment 3;

FIG. 16 is a diagram showing an example of 4-bit PDSCH resource assignment at the time of cross-subframe scheduling according to Embodiment 3;

FIG. 17 is a diagram showing an example of 4-bit PDSCH resource assignment at the time of same-subframe scheduling according to Embodiment 3;

FIG. 18 is a diagram showing an example of 4-bit PDSCH resource assignment at the time of same-subframe scheduling according to Embodiment 3;

FIG. 19 is a diagram showing an example of 3-bit PDSCH resource assignment at the time of cross-subframe scheduling according to Embodiment 3;

FIG. 21 is a diagram showing an example of 3-bit PDSCH resource assignment at the time of same-subframe scheduling according to Embodiment 3;

FIG. 22 is a diagram showing an example of 3-bit PDSCH resource assignment at the time of same-subframe scheduling according to Embodiment 3;

FIG. 23 is a diagram showing an example of 3-bit PDSCH resource assignment at the time of same-subframe scheduling according to Embodiment 3;

FIG. 24 is a diagram showing an example of 3-bit PDSCH resource assignment at the time of same-subframe scheduling according to Embodiment 3;

FIG. 27 is a diagram showing an example of narrowband assignment information according to Embodiment 4; and FIG. 28 is a diagram showing an example of 4-bit PDSCH resource assignment at the time of same-subframe scheduling.

DETAILED DESCRIPTION

Embodiments of the present disclosure are described in detail below with reference to the drawings.

Overview of Communication System

A communication system according to each embodiment of the present disclosure includes, for example, a base station 100 and a terminal 200 that are compatible with an LTE-Advanced system. The terminal 200 is, for example, an MTC terminal.

Figure 1:
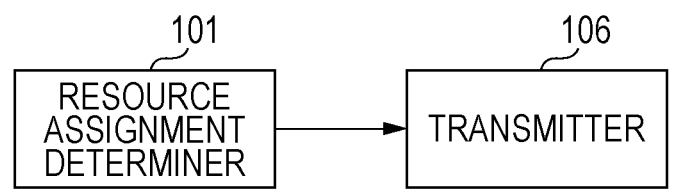
FIG. 1 is a block diagram showing the main components of a base station.

FIG. 1 is a block diagram showing the main components of a base station 100 according to an embodiment of the present disclosure. As shown in FIG. 1, the base station 100 includes a resource assignment determiner 101 that determines a resource for a PDSCH intended for an MTC terminal. The base station 100 also includes a transmitter 106 that transmits an MPDCCH that is a PDCCH intended for the MTC terminal containing resource assignment bits (RIV) indicating the resource thus determined and transmits the PDSCH using the resource thus determined.

Figure 2:
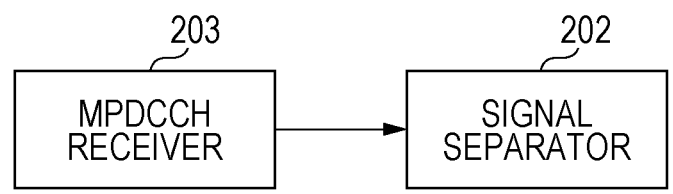
FIG. 2 is a block diagram showing the main components of a terminal.

Further, FIG. 2 is a block diagram showing the main components of a terminal 200 according to each embodiment of the present disclosure. As shown in FIG. 2, the terminal 200 includes an MPDCCH receiver 203 that receives an MPDCCH that is a PDCCH intended for an MTC terminal containing resource assignment bits (RIV) indicating a resource assigned to a PDSCH intended for the MTC terminal. The terminal 200 also includes a signal separator 202 that separates the PDSCH from a received signal using the resource indicated by the resource assignment bits.

Note here that the resource assignment bits (RIV) are associated with a resource that is used in a case where the MPDCCH and the PDSCH are transmitted in the same subframe (same-subframe scheduling) and a resource that is used in a case where the MPDCCH and the PDSCH are transmitted in different subframes (cross-subframe scheduling).

Embodiment 1

Configuration of Base Station

Figure 3:
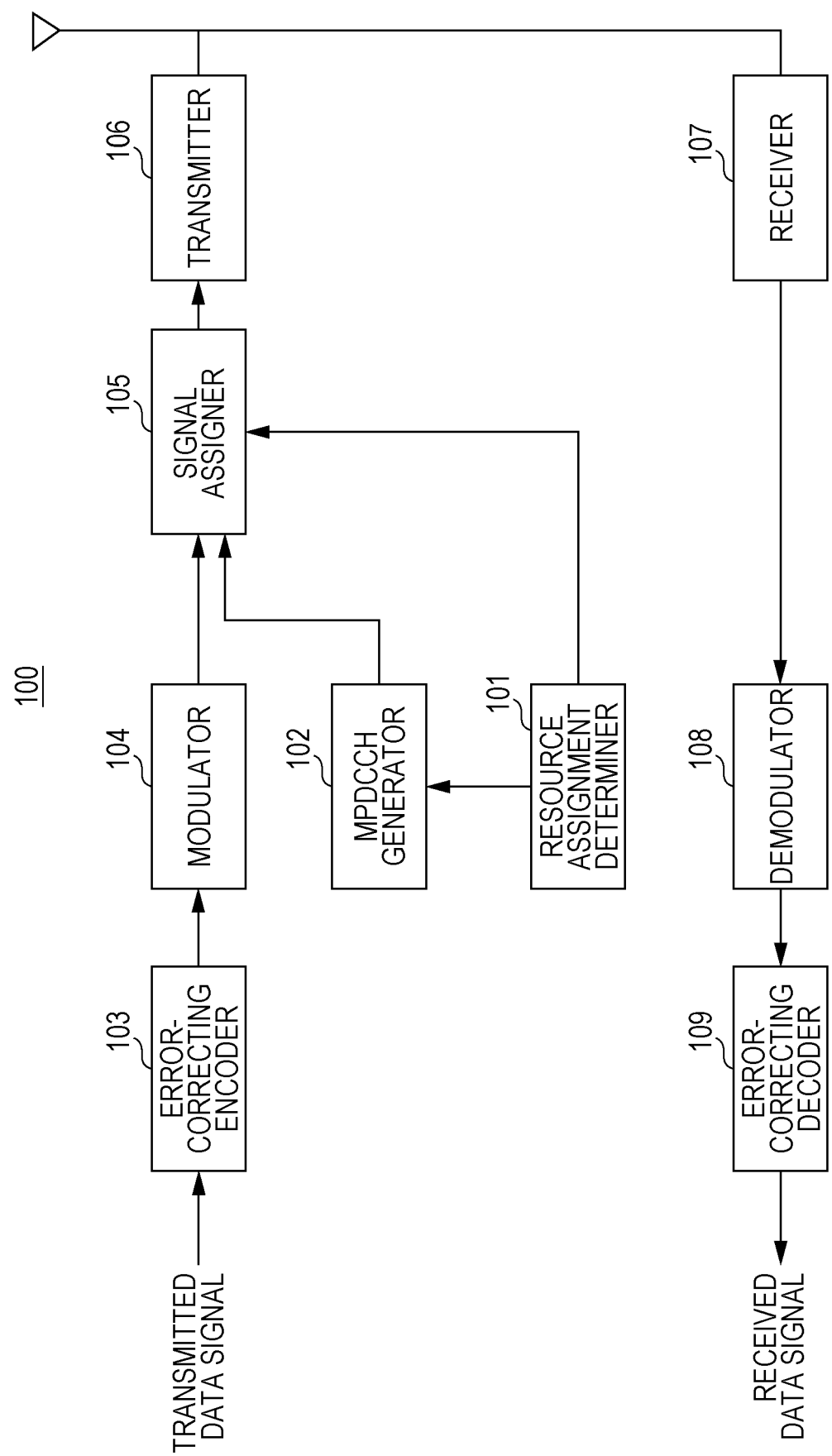
FIG. 3 is a block diagram showing a configuration of a base station.

FIG. 3 is a block diagram showing a configuration of a base station 100 according to Embodiment 1. As shown in FIG. 3, the base station 100 includes a resource assignment determiner 101, an MPDCCH generator 102, an error-correcting encoder 103, a modulator 104, a signal assigner 105, a transmitter 106, a receiver 107, a demodulator 108, and an error-correcting decoder 109.

The resource assignment determiner 101 determines a DL resource for a PDSCH intended for an MTC terminal. Specifically, the resource assignment determiner 101 determines whether a DL resource (PDSCH) intended for the MTC terminal is allocated to the same subframe as (same-subframe scheduling) or allocated to a different subframe from (cross-subframe scheduling) an MPDCCH to which assignment information of the DL resource is allocated. Further, the resource assignment determiner 101 determines which PRB the PDSCH is assigned to. The resource assignment determiner 101 outputs resource assignment information indicating the resource thus determined to the MPDCCH generator 102 and the signal assigner 105.

The MPDCCH generator 102 generates DCI on the basis of the resource assignment information that the MPDCCH generator 102 receives from the resource assignment determiner 101. In so doing, the MPDCCH generator 102 uses different methods for generating resource assignment bits (RIV: resource indication value) indicating a resource assignment to a PRB, depending on whether the DL resource (PDSCH) intended for the MTC terminal is assigned to the same subframe as (same-subframe scheduling) or assigned to a different subframe from (cross-subframe scheduling) an MPDCCH on which a DL resource assigning control signal is mapped. Specifically, in the case of same-subframe scheduling, the MPDCCH generator 102 excludes a PRB to which the MPDCCH is allocated from the PRBs within the narrowband and generates resource assignment bits targeted at the remaining PRBs. Meanwhile, in the case of cross-subframe scheduling, the MPDCCH generator 102 generates resource assignment bits targeted at all of the PRBs within the narrowband. The MPDCCH generator 102 generates DCI containing the resource assignment bits (DL resource assigning control signal) thus generated and outputs a control signal (MPDCCH) containing the DCI to the signal assigner 105.

The error-correcting encoder 103 error-correcting encodes a transmitted data signal (DL data signal) and outputs the data signal thus encoded to the modulator 104.

The modulator 104 performs a modulation process on the signal that the modulator 103 receives from the error-correcting encoder 103, and outputs the data signal thus modulated to the signal assigner 105.

On the basis of the resource assignment information that the signal assigner 105 receives from the resource assignment determiner 101, the signal assigner 105 assigns, to a predetermined resource(s), the data signal (PDSCH) that the signal assigner 105 receives from the modulator 104 and the control signal (MPDCCH) that the signal assigner 105 receives from the MPDCCH generator 102. A transmitted signal is formed by assigning the control signal (MPDCCH) and the data signal (PDSCH) to the predetermined resource(s). The transmitted signal thus formed is outputted to the transmitter 106.

The transmitter 106 performs a radio transmission process such as up-conversion on the transmitted signal that is inputted from the signal assigner 105, and transmits the resulting signal to the terminal 200 via an antenna.

The receiver 107 receives via the antenna a signal transmitted from the terminal 200, performs a radio reception process such as down-conversion on the received signal, and outputs the resulting signal to the demodulator 108.

The demodulator 108 performs a demodulation process on the signal that is inputted from the receiver 107, and outputs the resulting signal to the error-correcting decoder 109.

The error-correcting decoder 109 decodes the signal that is inputted from the demodulator 108, and obtains the received data signal from the terminal 200.

Configuration of Terminal

Figure 4:
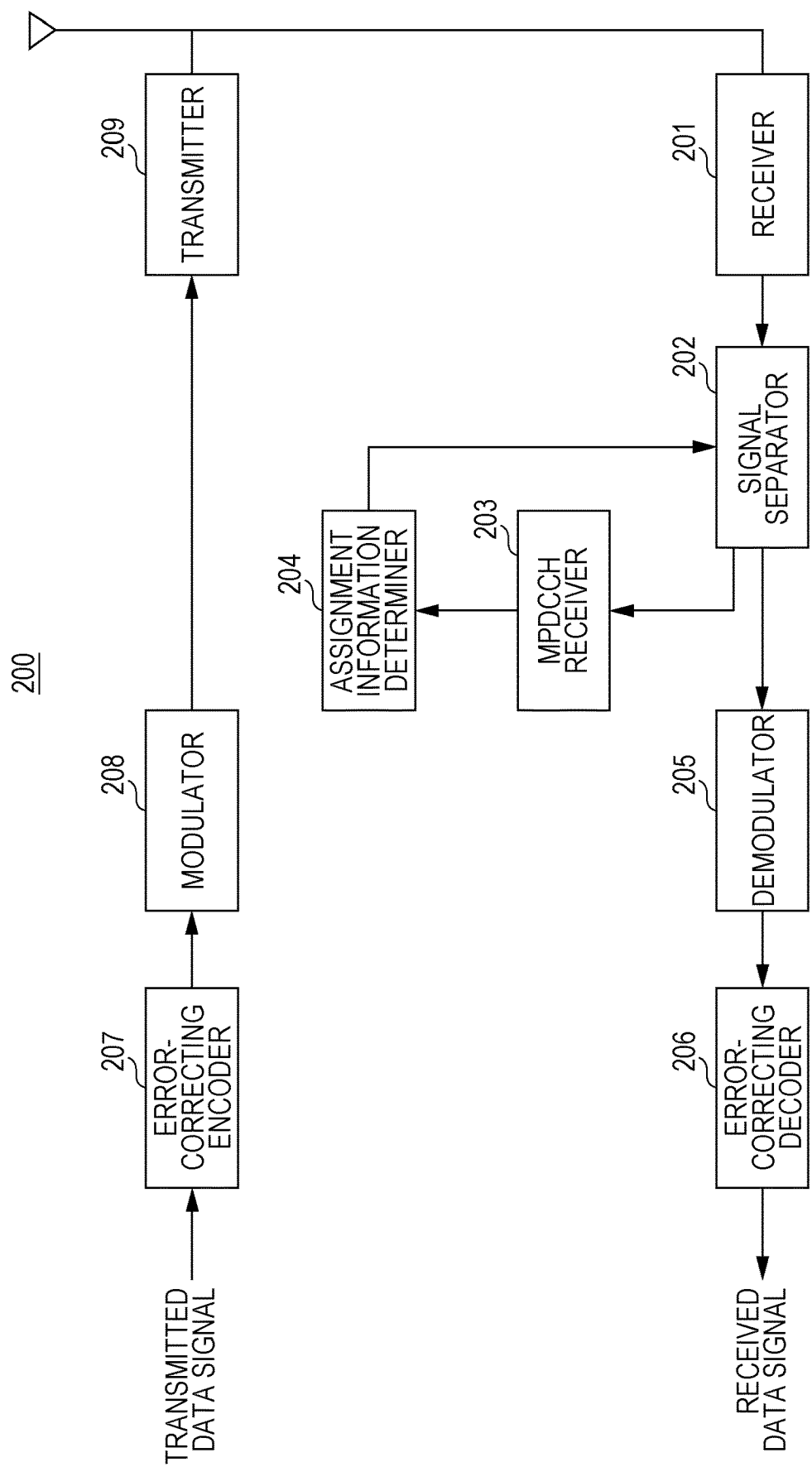
FIG. 4 is a block diagram showing a configuration of a terminal.

FIG. 4 is a block diagram showing a configuration of a terminal 200 according to Embodiment 1. As shown in FIG. 4, the terminal 200 includes a receiver 201, a signal separator 202, an MPDCCH receiver 203, an assignment information determiner 204, a demodulator 205, an error-correcting decoder 206, an error-correcting encoder 207, a modulator 208, and a transmitter 209.

The receiver 201 identifies, on the basis of a predetermined pattern, which narrowband within the system band a signal is assigned to, and retunes to the narrowband thus identified. Then, the receiver 201 receives a received signal via an antenna, performs a reception process such as down-conversion on the received signal, and then outputs the resulting signal to the signal separator 202.

The signal separator 202 outputs, to the MPDCCH receiver 203, a signal (MPDCCH signal) mapped on a PRB to which an MPDCCH may be assigned. Further, the signal separator 202 separates a DL data signal and higher-layer signaling from the received signal on the basis of DL resource assignment information that is inputted from the assignment information determiner 204 and outputs the resulting signal to the demodulator 205.

The MPDCCH receiver 203 blind decodes a search space of the MPDCCH signal that the MPDCCH receiver 203 receives from the signal separator 202, and outputs, to the assignment information determiner 204, a control signal (DCI) containing a DL resource assigning control signal detected as a signal addressed to the terminal 200.

The assignment information determiner 204 analyzes the DCI that is inputted from the MPDCCH receiver 203 and determines whether a DL resource (PDSCH) intended for the MTC terminal is assigned to the same subframe as or assigned to a different subframe from an MPDCCH on which the DL resource assigning control signal is mapped. Further, in a case where the DL resource (PDSCH) is assigned to the same subframe as the MPDCCH on which the DL resource assigning control signal is mapped, the assignment information determiner 204 excludes a PRB to which the MPDCCH is allocated from the PRBs within the narrowband and determines that the resource is assigned to the remaining PRBs. Meanwhile, in a case where the DL resource (PDSCH) is assigned to a different subframe from the MPDCCH on which the DL resource assigning control signal is mapped, the assignment information determiner 204 determines that the resource is assigned to all of the PRBs within the narrowband. Then, the assignment information determiner 204 identifies, on the basis of resource assignment bits (RIV) contained in the DCI, the resource assigned to the PDSCH. The assignment information determiner 204 outputs, to the signal separator 202, assignment information indicating the DL resource assigned to the terminal 200.

The demodulator 205 demodulates the signal that the demodulator 205 receives from the signal separator 202, and outputs the signal thus demodulated to the error-correcting decoder 206.

The error-correcting decoder 206 decodes the demodulated signal that the error-correcting decoder 206 receives from the demodulator 205, and outputs the resulting received data signal.

The error-correcting encoder 207 error-correcting encodes a transmitted data signal (UL data signal) and outputs the data signal thus encoded to the modulator 208.

The modulator 208 modulates the data signal that the modulator 208 receives from the error-correcting encoder 207, and outputs the data signal thus modulated to the transmitter 209.

The transmitter 209 identifies, on the basis of a predetermined pattern, the resource that corresponds to the narrowband to which the UL data is assigned, and performs retuning. Then, the transmitter 209 performs a transmission process such as up-conversion on the signal that is inputted from the modulator 208, and transmits the resulting signal using the resource thus identified.

Operation of Base Station 100 and Terminal 200

The following describes in detail how the base station 100 thus configured and the terminal 200 thus configured operate.

The following description assumes that DCI contains one bit of control information indicating whether an MPDCCH on which a DL resource assigning control signal is mapped and DL data (PDSCH) that is assigned by the DL resource assigning control signal are allocated to the same subframe or allocated to different subframes. Then, the DCI containing this one bit of control information is transmitted from the base station 100 to the terminal 200.

Let it be also assumed that a narrowband is composed of six PRBs and an RIV serving as resource assignment bits for notifying the assignment of the PRBs within the narrowband is composed of five bits. The five bits of this RIV are equal to the case of assignment of a resource whose bandwidth is 6 PRBs in Type 2 assignment supported by DCI format 1A in the existing LTE. Note, however, that, in Type 2 assignment of LTE, DCI contains one bit indicating whether the assignment is localized or distributed. Note here that the number of bits of DCI is reduced by limiting to localized assignment and omitting one bit indicating whether the assignment is localized or distributed.

Further, the following assumes that in a case where the MPDCCH and the PDSCH are allocated to the same subframe, Single User MIMO of the MPDCCH and the PDSCH is not applied to the MTC terminal.

In a case where the MPDCCH and the PDSCH are allocated to different subframes (cross-subframe scheduling), the base station 100 (MPDCCH generator 102) generates an RIV targeted at all of the six PRBs within the narrowband. That is, in a case where the MPDCCH and the PDSCH are allocated to different subframes, the PDSCH may be allocated to any of the six PRBs within the narrowband.

Figure 5:
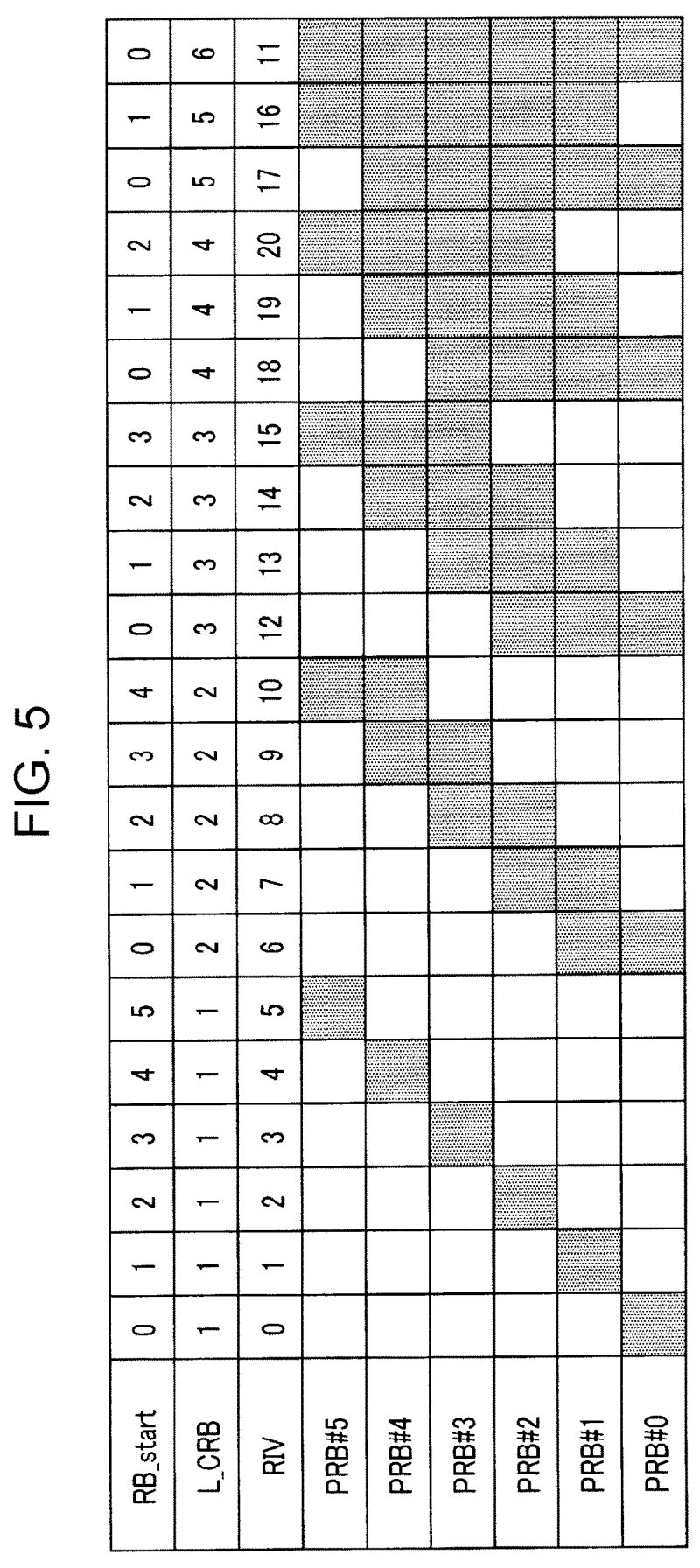

FIG. 5 is a diagram showing an example of a relationship between the RIV and the resource assignment of PRBs in Type 2 localized assignment.

FIG. 5 assumes that the PRBs within the narrowband are PRBs #0 to #5. Further, in FIG. 5, RB_start represents the start position of an assigned resource based on PRB #0 and L_CRB represents the size (number of PRBs) of the assigned resource. For example, the value of the RIV is calculated by parameters including RB_start and L_CRB. Further, in a case where the RIV (resource assignment bits) is composed of five bits, the RIV can take on a value of 0 to 31 (denoted by bits of 00000 to 11111); however, in Type 2 localized assignment, as shown in FIG. 5, the resource assignment of the PDSCH is defined only for RIV=0 to 20.

Meanwhile, in a case where the MPDCCH and the PDSCH are allocated to the same subframe (same-subframe scheduling), the PDSCH is not allocated to a PRB to which the MPDCCH, which contains the DL resource assigning control signal for the MTC terminal, is allocated. This makes it possible to exclude the PRB to which the MPDCCH is allocated from the assignment of the PDSCH.

Accordingly, in a case where the MPDCCH and the PDSCH are allocated to the same subframe, the base station 100 (MPDCCH generator 102) excludes the PRB to which the MPDCCH is allocated from the six PRBs within the narrowband and generates an RIV targeted at the remaining PRBs. Note here that since the MPDCCH is allocated to at least one PRB, the six PRBs within the narrowband include a maximum of five PRBs to which the PDSCH is assigned. This allows the base station 100 to use the five bits of the RIV to notify the terminal 200 by bitmap of the assignment of the PDSCH among the five PRBs. That is, this makes it possible to notify all assignment patterns of the PDSCH.

Figure 6:
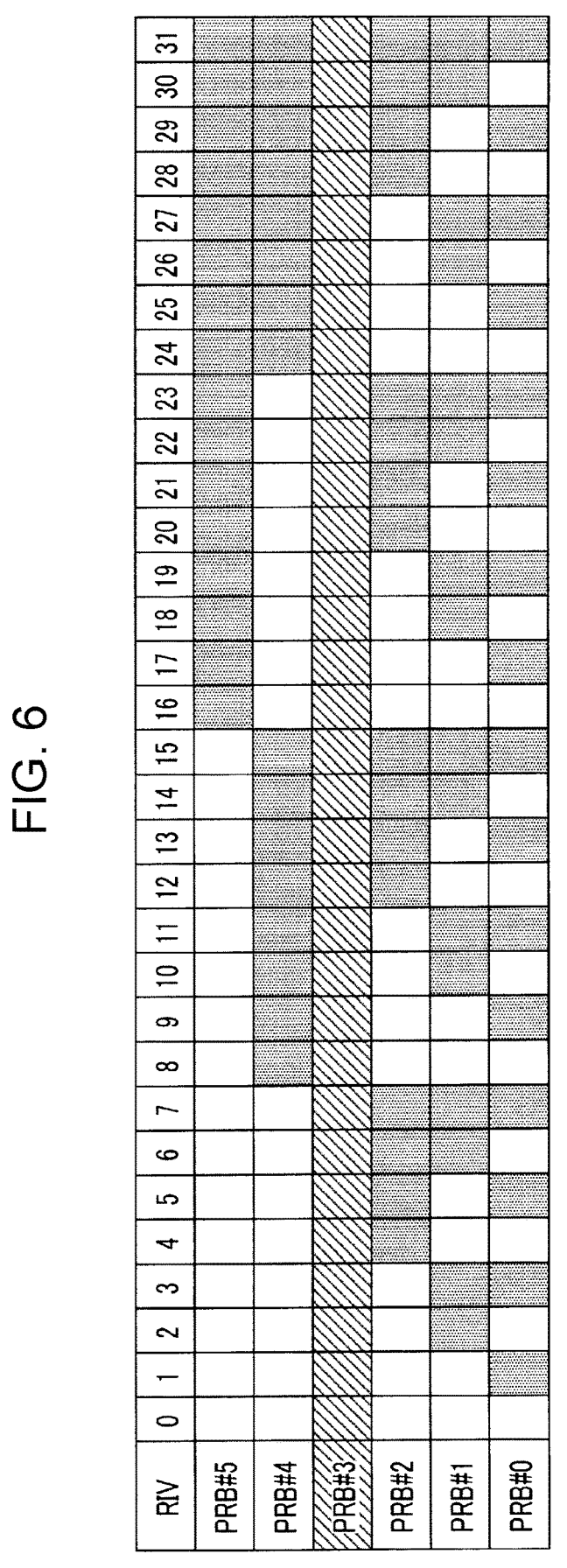

FIG. 6 is a diagram showing an example of a relationship between the RIV and the resource assignment of PRBs in a case where the MPDCCH and the PDSCH are allocated to the same subframe.

FIG. 6 assumes that the PRBs within the narrowband are PRBs #0 to #5. Further, FIG. 6 shows, as an example, the resource assignment of the PDSCH in a case where the MPDCCH, which contains the DL resource assigning control signal for the MTC terminal, is allocated to PRB #3.

That is, since, as shown in FIG. 6, the MPDCCH is allocated to PRB #3, PRB #3 is excluded from targets of resource assignment of the PDSCH and the remaining PRBs #0, 1, 2, 4, and 5 are targets of resource assignment of the PDSCH.

For example, each of the five bits of the RIV may indicate the presence or absence of an assignment to the corresponding one of the five PRBs that are targets of resource assignment of the PDSCH. In FIG. 6, RIV=0 is denoted by bits of 00000, and RIV=31 is denoted by bits of 11111. In this case, the lower bits of the RIV correspond to PRB # that are smaller in PRB number. A bit whose value is 1 indicates the presence of a resource assignment to the corresponding PRB, and a bit whose value 0 indicates the absence of a resource assignment to the corresponding PRB. That is, in the example shown in FIG. 6, the five bits of the RIV indicate the presence or absence of resource assignments to the PRBs #0, 1, 2, 4, and 5 in order from the lower bits. For example, when denoted by bits, RIV=11 shown in FIG. 6 is 01011, which indicates that the resource is assigned to PRB #0, PRB #1, and PRB #4. The same applies to the other values of the RIV.

As shown in FIG. 6, the assignment of resources by a 5-bit bitmap to the five PRBs to which resources may be assigned for the PDSCH makes it possible to cover all assignment patterns, thus bringing about improvement in flexibility of resource assignment. This allows the base station 100 to, even in a case where a PRB within the narrowband is assigned to another terminal, flexibly select a resource assignment such as not using the PRB for the terminal 200.

It should be noted that, as shown in FIG. 6, RIV=0 (denoted by bits of 00000) is not used for assignment, as there are no resources to be assigned. Further, although FIG. 6 shows an example in which the MPDCCH is allocated to PRB #3, the PRB to which the MPDCCH is allocated may be another PRB. That is, there needs only be correspondence between the remaining PRBs excluding the PRB to which the MPDCCH is allocated and the bitmap represented by the RIV.

Meanwhile, the terminal 200 (MPDCCH receiver 203) detects an MPDCCH signal from a signal that is transmitted from the base station 100, and obtains a control signal (DCI) containing a DL resource assigning control signal. The terminal 200 (assignment information determiner 204) determines, on the basis of information contained in the DCI, whether the MPDCCH and the PDSCH are allocated to the same subframe or allocated to different subframes. Then, the terminal 200 identifies the resource assignment of the PDSCH with varying interpretations of the RIV contained in the DCI, depending on whether the MPDCCH and the PDSCH are allocated to the same subframe or allocated to different subframes.

For example, in a case where the MPDCCH and the PDSCH are allocated to different subframes, the terminal 200 identifies, on the basis of such an RIV as that shown in FIG. 5 targeted at all of the six PRBs within the narrowband, the PRB(s) to which the resource is assigned. Meanwhile, in a case where the MPDCCH and the PDSCH are allocated to the same subframe, the terminal 200 excludes a PRB such as that shown in FIG. 6 to which the MPDCCH is allocated from the six PRBs within the narrowband and identifies, on the basis of an RIV targeted at the remaining PRBs, the PRB to which the resource is assigned.

It should be noted that assuming that the MPDCCH is one obtained by enhancing an EPDCCH for use in the narrowband, the MTC terminal is not likely to misjudge the aggregation level of the MPDCCH to be detected. The aggregation level is a unit that represents the resource amount of the MPDCCH, and in the case of an EPDCCH, the number of ECCEs (enhanced control channel elements) that constitute the EPDCCH varies depending on the aggregation level. When the MTC terminal detects the MPDCCH at a correct aggregation level, the base station 100 and the MTC terminal share the recognition of which PRB the MPDCCH is allocated to. Therefore, since the MTC terminal detects the MPDCCH in the PRB to which the base station 100 allocated the MPDCCH, the MTC terminal can correctly exclude the PRB to which the MPDCCH is allocated from resource assignment.

As shown in FIGS. 5 and 6, that the RIV (resource assignment bits) is associated with a resource that is used in a case where the MPDCCH and the PDSCH are transmitted in the same subframe and a resource that is used in a case where the MPDCCH and the PDSCH are transmitted in different subframes. More specifically, the same value of the RIV is associated with a resource that is used in a case where the MPDCCH and the PDSCH are transmitted in the same subframe and a resource that is used in a case where the MPDCCH and the PDSCH are transmitted in different subframes.

Further, the base station 100 and the terminal 200 vary interpretations of the resource assignment bits (RIV) within the DCI according to a relationship of the subframe(s) to which the MPDCCH and the PDSCH are allocated. This allows the base station 100 to notify the terminal 200 of resource assignments suited to the case where the MPDCCH and the PDSCH are allocated to the same subframe and the case where the MPDCCH and the PDSCH are allocated to different subframes, respectively.

Further, in Embodiment 1, in a case where the number of remaining PRBs (in FIG. 6, five bits) excluding a PRB to which the MPDCCH is allocated is equal to or less than the number of bits of the RIV (in FIG. 6, five bits) in a case where the MPDCCH and the PDSCH are transmitted in the same subframe, each of the bits of the RIV is bitmapped information that indicates the presence or absence of an assignment to the corresponding one of the remaining PRBs. This allows resource assignment to be performed by a bitmap to the PDSCH in a case where the MPDCCH and the PDSCH are allocated to the same subframe, thus bringing about improvement in flexibility of resource assignment.

As described above, Embodiment 1 makes it possible to use DCI to efficiently notify information for resource assignment.

Variation 1

FIG. 6 describes a case where the MPDCCH is allocated to one PRB in the narrowband. On the other hand, there may be a case where the MPDCCH is allocated to two or more PRBs. Accordingly, Variation 1 describes, as an example, a case where the MPDCCH is allocated to two or four PRBs.

FIG. 7 shows a relationship between the RIV and the resource assignment of the PDSCH in a case where the MPDCCH is allocated to two PRBs (PRB #0 and PRB #3), and FIG. 8 shows a relationship between the RIV and the resource assignment of the PDSCH in a case where the MPDCCH is allocated to four PRBs (PRB #0, PRB #1, PRB #4, and PRB #5). It should be noted that the PRBs to which the MPDCCH is allocated in FIGS. 7 and 8 are not limited to these.

In particular, in a case where the setting of a search space of the MPDCCH is distributed assignment, the MPDCCH may be allocated over a plurality of PRBs as shown in FIG. 7 or 8, even in a case where the aggregation level is low.

In a case where the MPDCCH is allocated over two PRBs as shown in FIG. 7, the PDSCH for the MTC terminal may be assigned to any of the remaining four PRBs. Therefore, the assignment of resources to the PDSCH by a 4-bit bitmap (RIV=0 to 15. Note, however, that RIV=0 is not used for assignment) with the use of the RIV makes it possible to cover all assignment patterns.

Further, in a case where the MPDCCH is allocated over four PRBs as shown in FIG. 8, the PDSCH for the MTC terminal may be assigned to any of the remaining two PRBs. Therefore, the assignment of resources by a 2-bit bitmap (RIV=0 to 4. Note, however, that RIV=0 is not used for assignment) with the use of the RIV makes it possible to cover all assignment patterns.

Variation 2

Embodiment 1 described above has shown an example in which Type 2 localized assignment (see FIG. 5) is used in a case where the PDSCH for the MTC terminal and the MPDCCH are allocated to different subframes. However, the resource assignment to the PDSCH in a case where the PDSCH for the MTC terminal and the MPDCCH are allocated to different subframes is not limited to Type 2 localized assignment, but another assignment method in which the six PRBs within the narrowband are targets of assignment may be defined.

In Type 2 localized assignment, only contiguous PRBs are assigned, but in a new assignment method, non-contiguous PRBs may be assigned. Further, since, in the existing LTE system, Type 2 assignment defines the RIV sharing a common expression between different frequency bands, only RIV=0 to 20 is used even in the case of a bandwidth of 6 PRBs. On the other hand, as a new assignment method, RIV=0 to 31 may all be used by defining a resource assignment specialized in a bandwidth of 6 PRBs. This makes flexible resource assignment possible.

Figure 9:
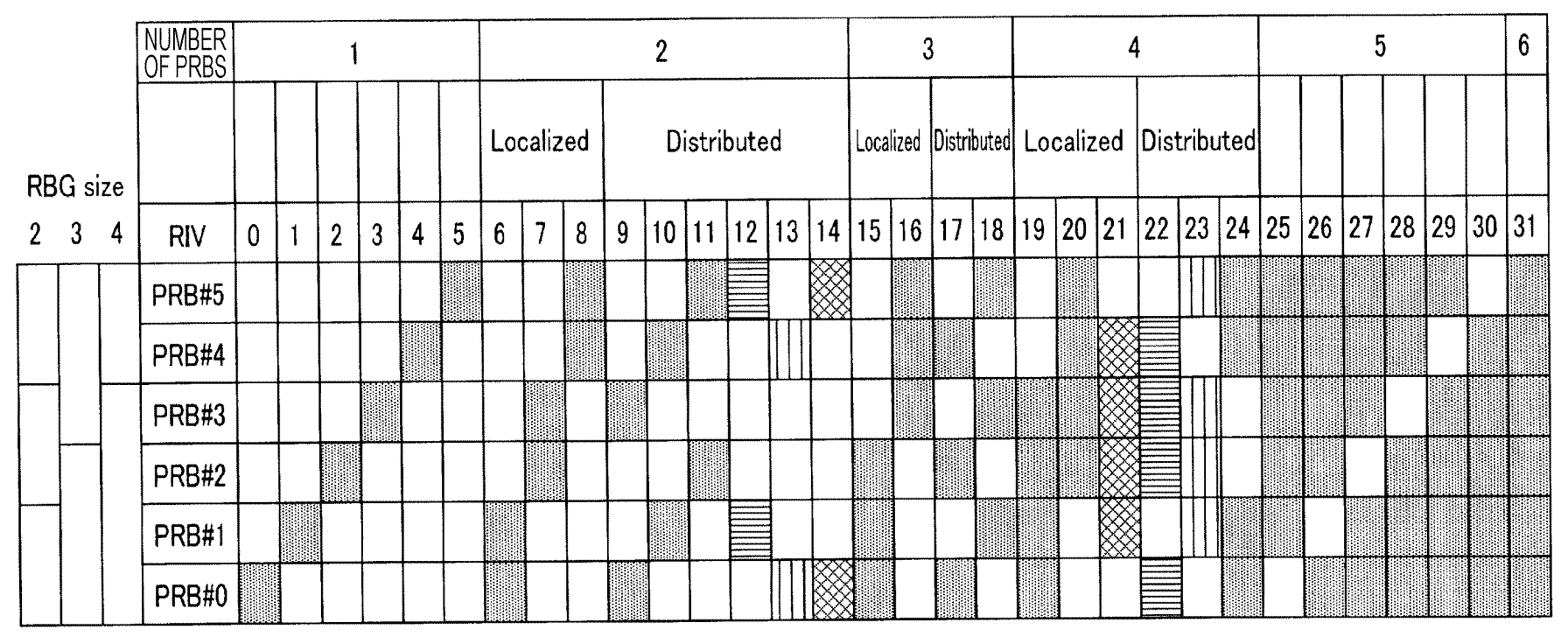

FIG. 9 shows an example of resource assignment that is used in a case where the PDSCH for the MTC terminal and the MPDCCH are allocated to different subframes.

In a case where the number of PRBs shown in FIG. 9 (which is equivalent to L_CRB shown in FIG. 5) is 1, 5, or 6, all assignment patterns are covered. Meanwhile, in a case where the number of PRBs shown in FIG. 9 is 2, 3, or 4, all assignment patterns are not covered, but both localized assignment and distributed assignment are encompassed.

Localized assignment is an assignment suited to PRB bundling that improves the reception quality of a DMRS (demodulation reference signal) by setting the same antenna precoding between contiguous PRBs. Further, distributed assignment is an assignment that brings about a frequency diversity effect within the narrowband.

Further, the resource assignment shown in FIG. 9 includes the following features:

(1) A combination of RIV=6 to 8 where the number of PRBs is 2, a combination of RIV=9 to 11 where the number of PRBs is 2, a combination of RIV=15 and 16 where the number of PRBs is 3, and a combination of RIV=17 and 18 where the number of PRBs is 3 are each composed of PRBs that do not overlap, so that they can be simultaneously assigned.

(2) At RIV=6 to 8 where the number of PRBs is 2, it is possible to perform the same assignment as an RBG-by-RBG assignment in which the RBG size is 2. Note, however, that in a case where the RBG and the narrowband have different boundary lines of allocation, the assignment of PRBs by some RIVs may be subjected to a cyclic shift within the narrowband according to the RBG so that the same assignment as the RBG-by-RBG assignment can be performed in the narrowband.

(3) At RIV=15 to 16 where the number of PRBs is 3, it is possible to perform the same assignment as an RBG-by-RBG assignment in which the RBG size is 3. Note, however, that in a case where the RBG and the narrowband have different boundary lines of allocation, the assignment of PRBs by the RIV may be an assignment subjected to a cyclic shift within the narrowband according to the RBG so that the same assignment as the RBG-by-RBG assignment can be performed in the narrowband.

(4) At RIV=19 to 21 where the number of PRBs is 4, it is possible to perform the same assignment as an RBG-by-RBG assignment in which the RBG size is 4. Note, however, that different RIVs result in the same assignment as the RBG-by-RBG assignment, depending on the allocation of the RBG and the narrowband. For example, in the example shown in FIG. 9, the assignment in which RIV=19 is an RBG-by-RBG assignment.

(5) A combination of RIV=12 where the number of PRBs is 2 and RIV=22 where the number of PRBs is 4, a combination of RIV=13 where the number of PRBs is 2 and RIV=23 where the number of PRBs is 4, and a combination of RIV=14 where the number of PRBs is 2 and RIV=21 where the number of PRBs is 4 are each composed of PRBs that do not overlap, so that they can be simultaneously assigned. In particular, the combination of RIV=12 where the number of PRBs is 2 and RIV=22 where the number of PRBs is 4 and the combination of RIV=13 where the number of PRBs is 2 and RIV=23 where the number of PRBs is 4 each have an interval of 4 PRBs between the ends of each assignment, thus achieving an assignment with a high frequency diversity effect. That is, these are assignments that maximize the frequency diversity effect in a case where an assignment in which the number of PRBs is 2 and an assignment in which the number of PRBs is 4 are simultaneously used.

Embodiment 2

When, as in the case of Embodiment 1, a bit indicating whether an MPDCCH on which a DL resource assigning control signal is mapped and DL data (PDSCH) are allocated to the same subframe or allocated to different subframes is added to DCI, the DCI becomes longer in DCI length. An increase in DCI length causes an MTC terminal to require more received power for reception, thus narrowing the coverage of the MTC terminal. Therefore, DCI for an MTC terminal is required to be short in DCI length while containing information needed for the resource assignment to the MTC terminal.

To address this problem, Embodiment 2 describes a method for reducing the DCI length.

It should be noted that a base station and a terminal according to Embodiment 2 share common basic components with the base station 100 and the terminal 200 according to Embodiment 1 and, as such, are described with continued reference to FIGS. 3 and 4, respectively.

In Embodiment 2, DCI does not contain one bit of control information indicating whether an MPDCCH on which a DL resource assigning control signal is mapped and DL data (PDSCH) that is assigned by the DL resource assigning control signal are allocated to the same subframe or allocated to different subframes, and a resource assignment is notified by 5 bits of RIV.

Let it be also assumed that a narrowband is composed of six PRBs and an RIV serving as resource assignment bits for notifying the assignment of the PRBs within the narrowband is composed of five bits.

Further, as in the case of Embodiment 1, the resource assignment in a case where the MPDCCH and the PDSCH are allocated to different subframes (cross-subframe scheduling) is the same as the case of assignment of a resource whose bandwidth is 6 PRBs in Type 2 assignment supported by DCI format 1A in the LTE. It should be noted that, as in the case of Embodiment 1, the number of bits of DCI is reduced by limiting to localized assignment and omitting one bit indicating whether the assignment is localized or distributed (i.e. Type 2 localized assignment).

Further, in Type 2 localized assignment, as shown in FIG. 5, the resource assignment of the PRBs with respect to the RIV is defined only for RIV=0 to 20.

In Embodiment 2, in the resource assignment to the PDSCH through the use of 5 bits of RIV, the base station 100 performs, by the remaining RIV=21 to 31, resource assignment in which the MPDCCH and the PDSCH are allocated to the same subframe (same-subframe scheduling). The terminal 200 determines, on the basis of the value of the RIV that is notified from the base station 100, whether the MPDCCH and the PDSCH are allocated to the same subframe or allocated to different subframes.

For example, the terminal 200 (MTC terminal) detects a DL resource assigning control signal in the MPDCCH of subframe #0, and when the DL resource assigning control signal contains an RIV of 21 to 31, the terminal 200 recognizes the PDSCH as being assigned to subframe #0, or when the DL resource assigning control signal contains an RIV of 0 to 20, the terminal 200 recognizes the PDSCH as being assigned to a subframe that follows subframe #0.

That is, the RIV according to Embodiment 2 includes a bit (here, RIV=21 to 31) associated with a resource that is used in a case where the MPDCCH and the PDSCH are transmitted in the same subframe and a bit (here, RIV=0 to 20) associated with a resource that is used in a case where the MPDCCH and the PDSCH are transmitted in different subframes.

Figure 10:
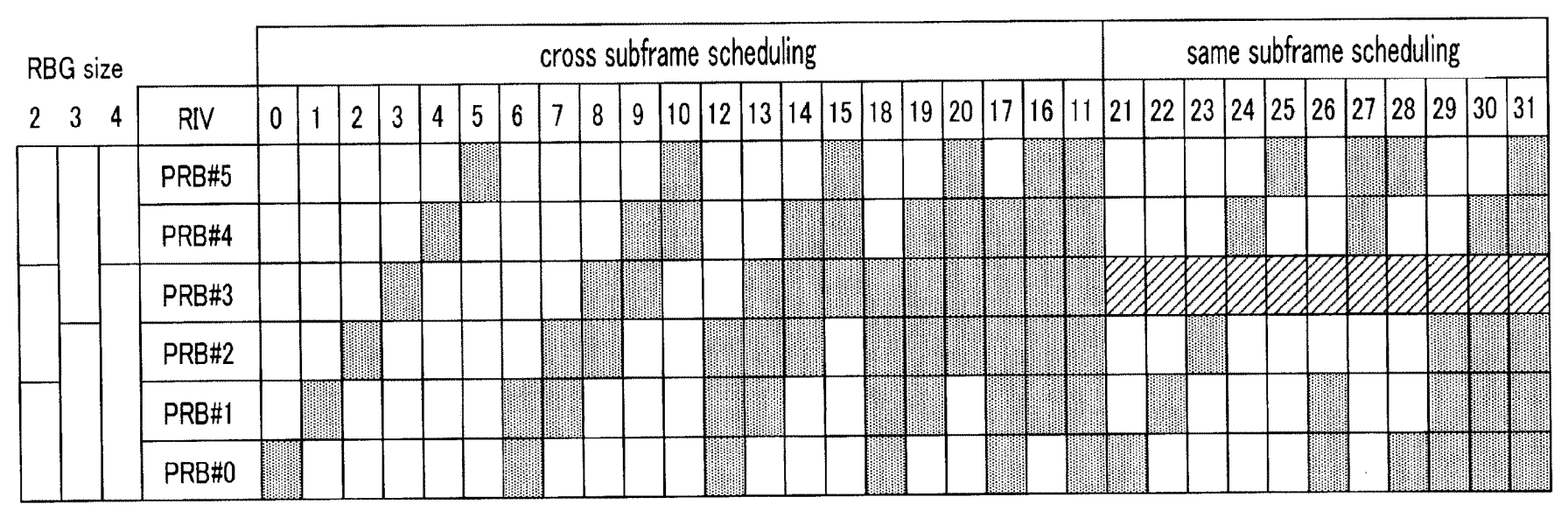

FIG. 10 shows an example of a relationship between the RIV and the resource assignment of the PDSCH according to Embodiment 2. FIG. 10 shows a case where a DL resource assigning control signal is allocated to a 1PRB (PRB #3) MPDCCH in a case where the MPDCCH and the PDSCH are allocated to the same subframe (same-subframe scheduling).

Since, as shown in FIG. 10, the MPDCCH is allocated to PRB #3 when RIV=21 to 31, PRB #3 is excluded from targets of resource assignment of the PDSCH and the remaining PRBs #0, 1, 2, 4, and 5 are targets of resource assignment of the PDSCH.

Further, as shown in FIG. 10, in a case where the number of PRBs that are targets of assignment is 1 (RIV=21 to 25) and a case where the number of PRBs that are targets of assignment is 5 (RIV=31), all assignment patterns are covered. Further, in a case where the number of PRBs that are targets of assignment is 2 (RIV=26 to 28), both localized assignment and distributed assignment are encompassed. In a case where the number of PRBs that are targets of assignment is 3 or 4 (RIV=29 to 30), the assignment is limited to localized assignment.

Furthermore, in a case where the number of PRBs that are targets of assignment is 2, 3, or 4 (RIV=26 to 30), the same-subframe scheduling shown in FIG. 10 includes the following features:

(1) At RIV=26 and 27 where the number of PRBs is 2, it is possible to perform the same assignment as an RBG-by-RBG assignment in which the RBG size is 2.

(2) At RIV=29 where the number of PRBs is 3, it is possible to perform the same assignment as an RBG-by-RBG assignment in which the RBG size is 3.

(3) At RIV=30 where the number of PRBs is 4, it is possible to perform, if any, the same assignment as an RBG-by-RBG assignment in which the RBG size is 4. In FIG. 10, the RBG whose RBG size is 4 is composed of PRBs #0 to #4, and the MPDCCH is allocated to PRB #3. Therefore, when RIV=30, it is impossible to perform the same assignment as an RBG-by-RBG assignment in which the RBG size is 4.

Thus, according to Embodiment 2, the base station 100 notifies the terminal 200, by the value taken on by 5 bits of RIV, of a resource assignment in which an MPDCCH on which a DL resource assigning control signal intended for the MTC terminal is mapped and a PDSCH to which DL data is allocated are allocated to the same subframe and a resource assignment in which the MPDCCH and the PDSCH are allocated to different subframes. In other words, the base station 100 notifies the terminal 200, by 5 bits of RIV, of the resource assignment of the PDSCH and implicitly notifies the terminal 200 whether the MPDCCH and the PDSCH are allocated to the same subframe or allocated to different subframes. This allows the terminal 200 to identify, from the value of the RIV received from the base station 100, whether the MPDCCH and the PDSCH are transmitted in the same subframe and identify a resource (PRB) to which the PDSCH is assigned. This eliminates the need for control information for notifying only whether the MPDCCH and the PDSCH are transmitted in the same subframe, thus making it possible to reduce the number of bits of DCI for MTC.

It should be noted that the resource assignment method in which the MPDCCH and the PDSCH are allocated to the same subframe (same-subframe scheduling) is not limited to the assignment patterns shown in FIG. 10. Further, the number of PRBs to which the MPDCCH is allocated is not limited to 1 but may be 2 or greater.

Figures 11, 12, 13:
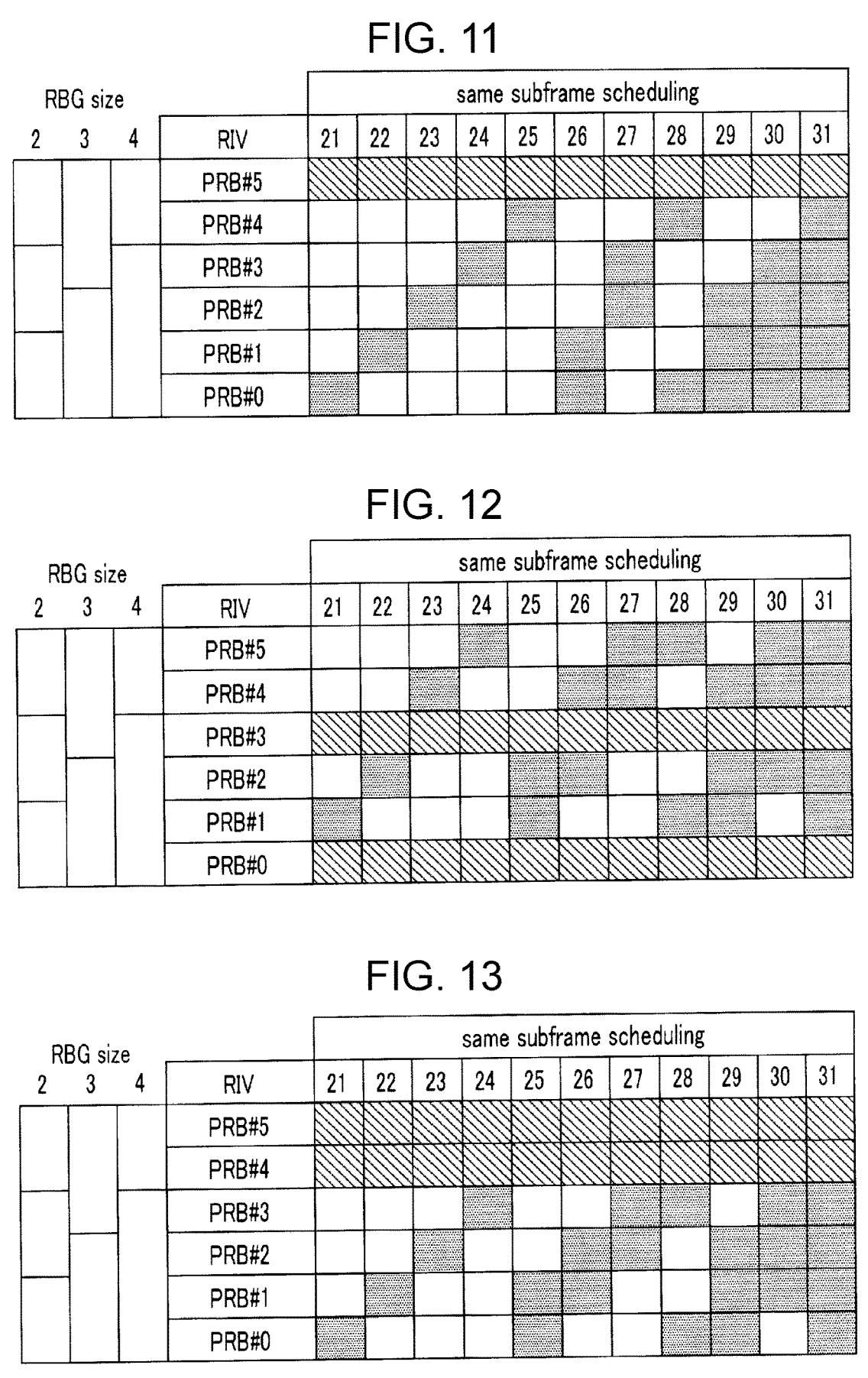

The following describes, as other examples of assignment patterns in which the MPDCCH and the PDSCH are allocated to the same subframe, the assignment patterns shown in FIGS. 11 to 13.

Variation 1

FIG. 11 shows an example in which the MPDCCH is allocated to PRB #5. In FIG. 11, the allocation of the MPDCCH does not overlap the allocation of an RBG (i.e. PRB #0 to PRB #3) whose RBG size is 4. Therefore, in FIG. 11, the resource assignment in which the number of PRBs that are targets of assignment is 4 makes it possible, when RIV=30, to perform the same assignment as an RBG-by-RBG assignment in which the RBG size 4.

Variation 2

FIGS. 12 and 13 show examples in which an MPDCCH containing a DL resource assigning control signal is allocated to two PRBs. In FIG. 12, the MPDCCH is allocated to PRB #0 and PRB #3, and in FIG. 13, the MPDCCH is allocated to PRB #4 and PRB #5. In this case, when RIV=21 to 31, the two PRBs to which the MPDCCH is allocated are excluded from the resource assignment of the PDSCH.

Cases where the numbers of PRBs shown in FIGS. 12 and 13 are 2 or 3 (RIV=25 to 30) include the following features:

(1) In a case where the number of PRBs that are targets of assignment is 1 (RIV=21 to 24) or 4 (RIV=31), all assignment patterns are covered.

(2) At RIV=27 where the number of PRBs is 2, it is possible to perform the same assignment as an RBG-by-RBG assignment in which the RBG size is 2.

(3) In a combination of RIV=25 and 27 or RIV=26 and 28 where the number of PRBs is 2, there is no overlap between the PRBs to be assigned, so that simultaneous assignment can be performed.

(4) When the number of PRBs is 3, it is possible to perform, if any, the same assignment as an RBG-by-RBG assignment in which the RBG size is 3. In FIG. 12, the RBG whose RBG size is 3 is composed of PRBs #0 to #2 or PRBs #3 to #5, and the MPDCCH is allocated to PRB #0 and PRB #3. This makes it impossible, regardless of RIV, to perform the same assignment as an RBG-by-RBG assignment in which the RBG size is 3. Meanwhile, in FIG. 13, the RBG whose RBG size is 3 is composed of PRBs #0 to #2 or PRBs #3 to #5, and the MPDCCH is allocated to PRB #4 and PRB #5. Therefore, when RIV=29, it is possible to perform the same assignment as an RBG-by-RBG assignment in which the RBG size is 3.

Variation 3

Embodiment 2 described above has shown an example in which Type 2 localized assignment (see FIG. 10) is used in a case where the PDSCH for the MTC terminal and the MPDCCH are allocated to different subframes. However, the resource assignment to the PDSCH in a case where the PDSCH for the MTC terminal and the MPDCCH are allocated to different subframes is not limited to Type 2 localized assignment, but another assignment method in which the six PRBs within the narrowband are targets of assignment may be defined.

In Type 2 localized assignment, only contiguous PRBs are assigned, but in a new assignment method, non-contiguous PRBs may be assigned.

Figure 14:
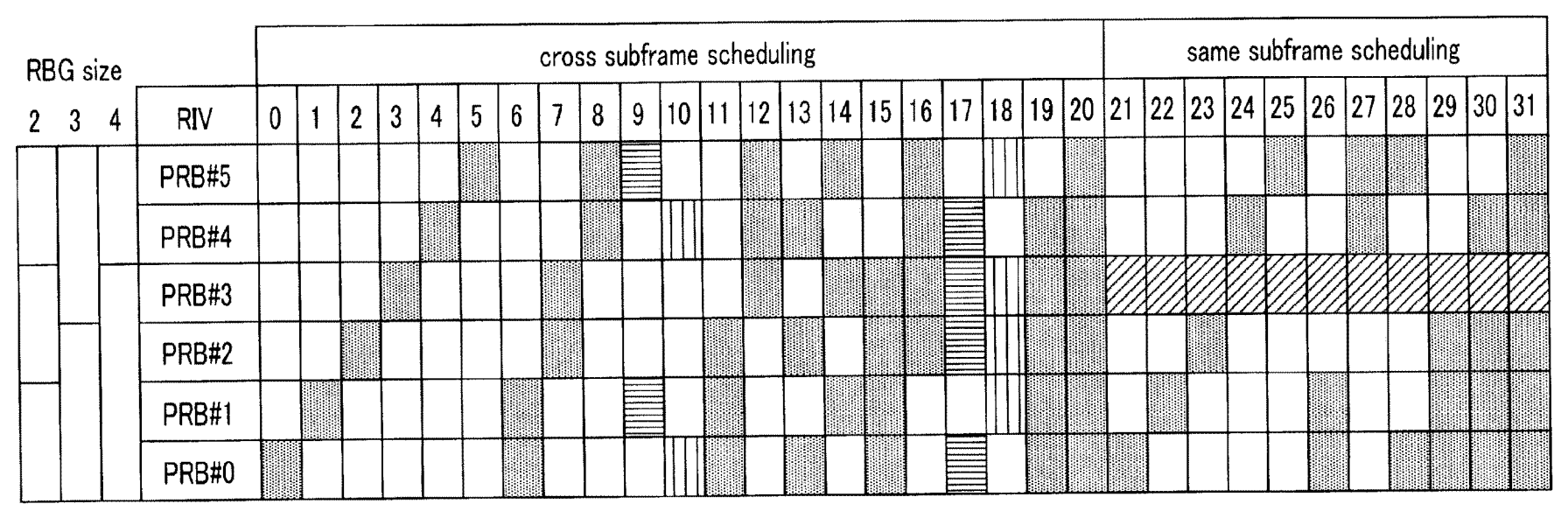

FIG. 14 shows an example of resource assignment that is used in a case where the PDSCH for the MTC terminal and the MPDCCH are allocated to different subframes. In an assignment method shown in FIG. 14, RIV=0 to 31 may all be used by defining a resource assignment specialized in a bandwidth of 6 PRBs. This makes flexible resource assignment possible.

Specifically, in a case where the number of PRBs shown in FIG. 14 (which is equivalent to L_CRB shown in FIG. 5) is 1 or 6, all assignment patterns are covered. Meanwhile, in a case where the number of PRBs shown in FIG. 14 is 2, 3, or 4, all assignment patterns are not covered, but both localized assignment and distributed assignment are encompassed.

Further, the resource assignment shown in FIG. 14 includes the following features:

(1) A combination of RIV=6 to 8 where the number of PRBs is 2, a combination of RIV=11 and 12 where the number of PRBs is 3, and a combination of RIV=13 and 14 where the number of PRBs is 3 are each composed of PRBs that do not overlap, so that they can be simultaneously assigned.

(2) At RIV=6 to 8 where the number of PRBs is 2, it is possible to perform the same assignment as an RBG-by-RBG assignment in which the RBG size is 2.

(3) At RIV=11 and 12 where the number of PRBs is 3, it is possible to perform the same assignment as an RBG-by-RBG assignment in which the RBG size is 3.

(4) At RIV=15 and 16 where the number of PRBs is 4, it is possible to perform the same assignment as an RBG-by-RBG assignment in which the RBG size is 4.

(5) A combination of RIV=9 where the number of PRBs is 2 and RIV=17 where the number of PRBs is 4 and a combination of RIV=10 where the number of PRBs is 2 and RIV=18 where the number of PRBs is 4 are each composed of PRBs that do not overlap, so that they can be simultaneously assigned. These combinations of RIVs each have an interval of 4 PRBs between the ends of each assignment, thus achieving an assignment with a high frequency diversity effect.

(6) At RIV=19 where the number of PRBs is 5, five out of the six PRBs of the narrowband excluding one PRB are assigned. This one PRB which is not assigned is not limited to PRB #5 shown in FIG. 14, but may be uniquely determined, for example, from C-RNTI (ID of the terminal (UE)) and the subframe number.

Embodiment 3

Embodiments 1 and 2 have described a case where the number of bits of the RIV is 5. On the other hand, Embodiment 3 describes a case of, in order to reduce the number of bits that are contained in a DL resource assigning control signal, further reducing the number of bits that are needed for resource assignment within a narrowband. A reduction in the number of bits allows the MTC terminal to require less received power to receive a DL resource assigning control signal and makes it possible to expand cell coverage.

It should be noted that a base station and a terminal according to Embodiment 3 share common basic components with the base station 100 and the terminal 200 according to Embodiment 1 and, as such, are described with continued reference to FIGS. 3 and 4, respectively.

The following describes cases (Example Operations 1-1 and 1-2) where the number of bits (number of bits of the RIV) that are needed for resource assignment to a PDSCH within a narrowband is 4 and cases (Example Operations 2-1 and 2-2) where the number of bits (number of bits of the RIV) that are needed for resource assignment to a PDSCH within a narrowband is 3.

Further, as in the cases of Embodiments 1 and 2, it is assumed that a narrowband is composed of six PRBs.

Example Operation 1-1: Number of Bits 4. Case of Cross-Subframe Scheduling

In a case where the MPDCCH and the PDSCH are allocated to different subframes (cross-subframe scheduling), all assignment patterns cannot be covered for six PRBs with four bits, so that assignment patterns of resources are limited.

Figure 15:
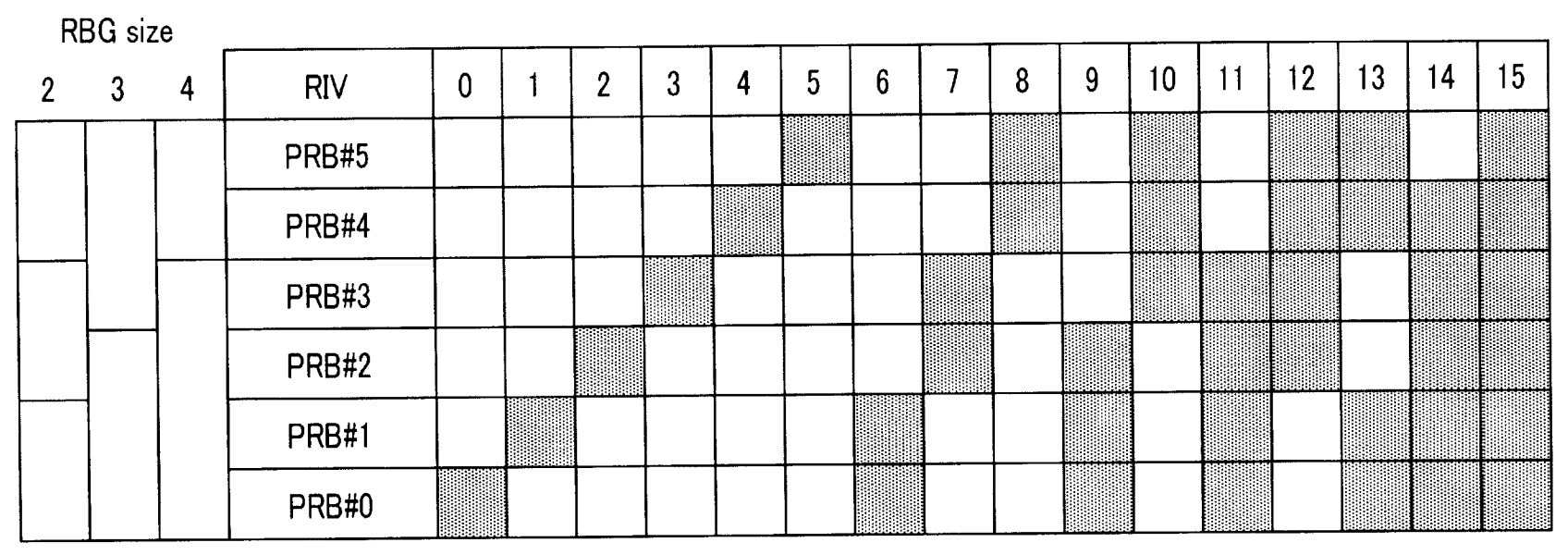

FIG. 15 shows an example of a relationship between the RIV and the resource assignment to the PDSCH in a case where the MPDCCH and the PDSCH are allocated to different subframes. The assignment patterns shown in FIG. 15 are assignment patterns with emphasis on localized assignment.

The resource assignment shown in FIG. 15 includes the following features:

(1) In a case where the number of PRBs is 1 (RIV=0 to 5) and a case where the number of PRBs is 6 (RIV=15), all assignment patterns are covered.

(2) A combination of RIV=6 to 8 where the number of PRBs is 2 and a combination of RIV=9 and 10 where the number of PRBs is 3 are each composed to PRBs that do not overlap, so that they can be simultaneously assigned.

(3) At RIV=6 to 8 where the number of PRBs is 2, it is possible to perform the same assignment as an RBG-by-RBG assignment in which the RBG size is 2.

(4) At RIV=9 and 10 where the number of PRBs is 3, it is possible to perform the same assignment as an RBG-by-RBG assignment in which the RBG size is 3.

(5) At RIV=11 and 12 where the number of PRBs is 4, it is possible to perform the same assignment as an RBG-by-RBG assignment in which the RBG size is 4.

(6) At RIV=14 where the number of PRBs is 5, five out of the six PRBs of the narrowband excluding one PRB are assigned. As in the case of FIG. 14, this one PRB which is not assigned is not limited to PRB #5 shown in FIG. 15, but may be uniquely determined, for example, from C-RNTI (ID of the terminal (UE)) and the subframe number.

Figure 16:
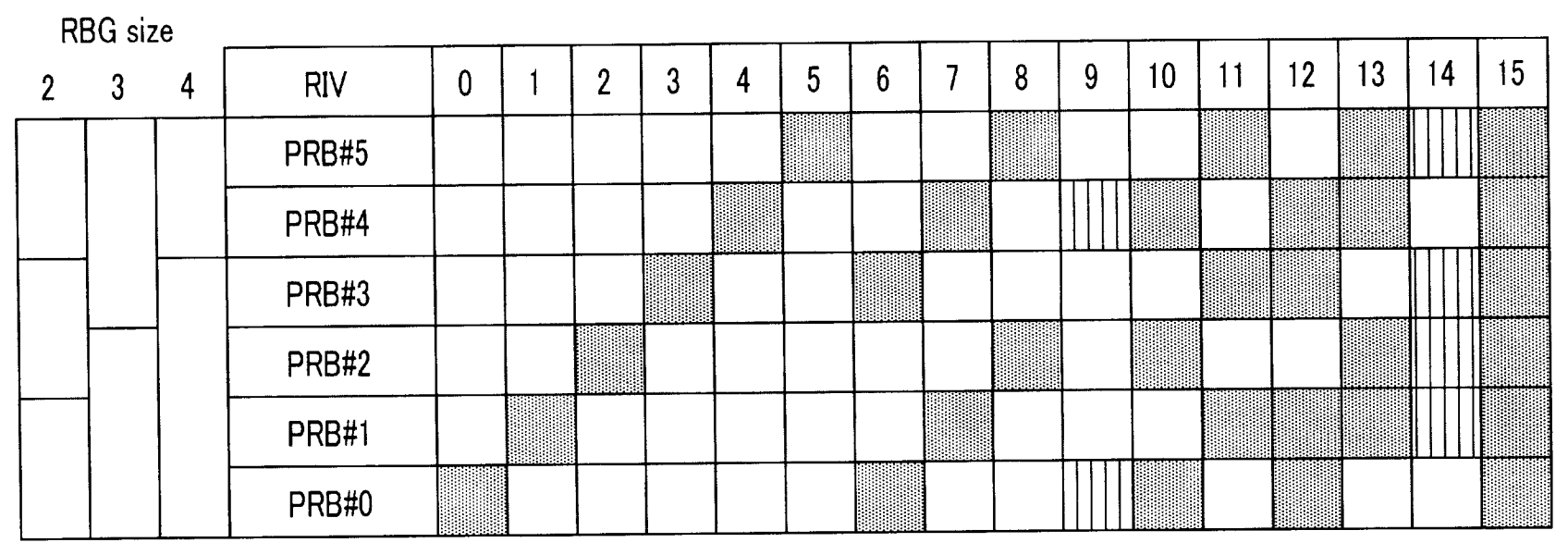

FIG. 16 shows another example of a relationship between the RIV and the resource assignment to the PDSCH in a case where the MPDCCH and the PDSCH are allocated to different subframes. The assignment patterns shown in FIG. 16 are assignment patterns with emphasis on distributed assignment.

The resource assignment shown in FIG. 16 includes the following features:

(1) In a case where the number of PRBs is 1 (RIV=0 to 5) and a case where the number of PRBs is 6 (RIV=15), all assignment patterns are covered.

(2) A combination of RIV=6 to 8 where the number of PRBs is 2 and a combination of RIV=10 and 11 where the number of PRBs is 3 are each composed to PRBs that do not overlap, so that they can be simultaneously assigned.

(3) A combination of RIV=9 where the number of PRBs is 2 and RIV=14 where the number of PRBs is 4 is composed of PRBs that do not overlap, so that they can be simultaneously assigned. The combination of RIV=9 where the number of PRBs is 2 and RIV=14 where the number of PRBs is 4 has an interval of 4 PRBs between the ends of each assignment, thus achieving an assignment with a high frequency diversity effect. That is, these are assignments that maximize the frequency diversity effect in a case where an assignment in which the number of PRBs is 2 and an assignment in which the number of PRBs is 4 are simultaneously used.

Example Operation 1-2: Number of Bits 4. Case of Same-Subframe Scheduling

In a case where the MPDCCH and the PDSCH are allocated to the same subframe (same-subframe scheduling), a PRB to which the MPDCCH is allocated is excluded from targets of resource assignment of the PDSCH. For example, in a case where the MPDCCH is allocated to one PRB, the resource assignment to five PRBs are notified by 4 bits of RIV. Further, for example, in a case where the MPDCCH is allocated to two PRBs, the resource assignment to four PRBs are notified by 4 bits of RIV. Note here that in a case where the resource assignment to four PRBs is notified by 4 bits of RIV, a bitmap can be used as in the case of Embodiment 1 (see, for example, FIG. 6).

Figure 17:
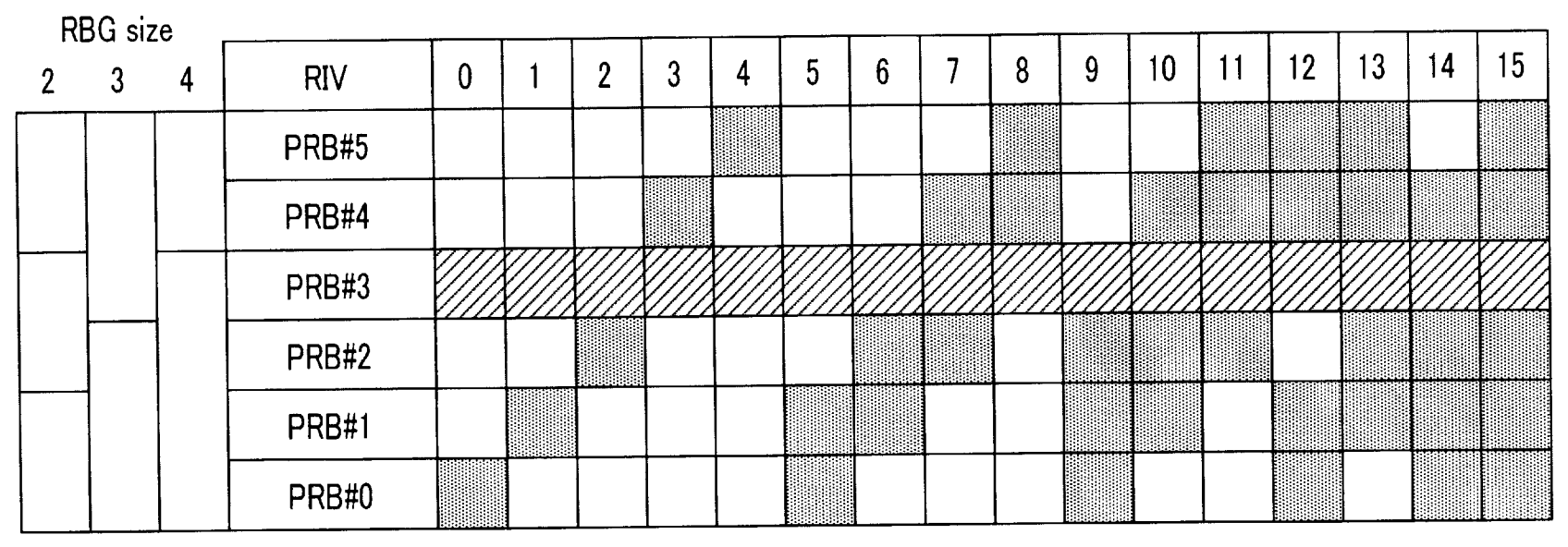

FIG. 17 shows an example of a relationship between the RIV and the resource assignment to the PDSCH in a case where the MPDCCH and the PDSCH are allocated to the same subframe. The assignment patterns shown in FIG. 17 are assignment patterns with emphasis on localized assignment. It should be noted that, in FIG. 17, the PRBs within the narrowband are PRBs #0 to #5 and the MPDCCH, which contains the DL resource assigning control signal for the MTC terminal, is allocated to PRB #3.

The resource assignment shown in FIG. 17 includes the following features:

(1) In a case where the number of PRBs is 1 (RIV=0 to 4) and a case where the number of PRBs is 5 (RIV=15), all assignment patterns are covered.

(2) At RIV=5 to 8 where the number of PRBs is 2 and RIV=9 to 11 where the number of PRBs is 3, localized assignment is emphasized.

Figure 18:
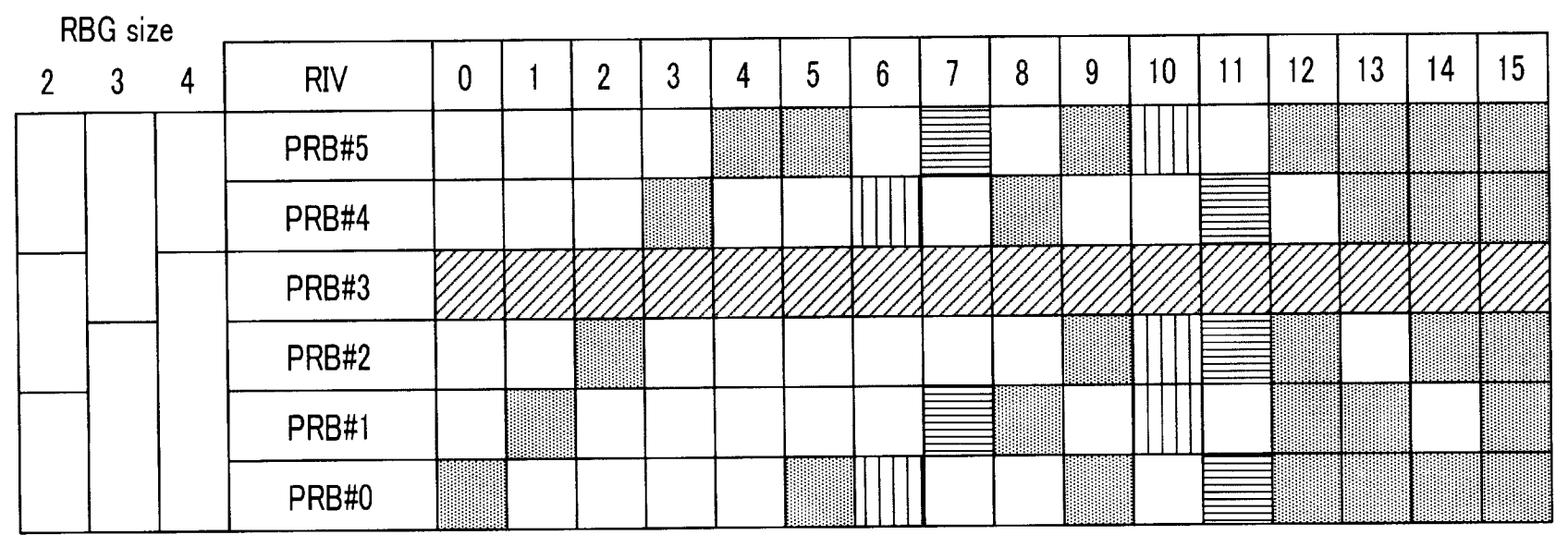

Next, FIG. 18 shows another example of a relationship between the RIV and the resource assignment to the PDSCH in a case where the MPDCCH and the PDSCH are allocated to the same subframe. The assignment patterns shown in FIG. 18 are assignment patterns with emphasis on distributed assignment. It should be noted that, in FIG. 18, as in the case of FIG. 17, the PRBs within the narrowband are PRBs #0 to #5 and the MPDCCH, which contains the DL resource assigning control signal for the MTC terminal, is allocated to PRB #3.

The resource assignment shown in FIG. 18 includes the following features:

(1) In a case where the number of PRBs is 1 (RIV=0 to 4) and a case where the number of PRBs is 5 (RIV=15), all assignment patterns are covered.

(2) At RIV=5 to 8 where the number of PRBs is 2 and RIV=9 to 11 where the number of PRBs is 3, distributed assignment is emphasized.

(3) A combination of RIV=6 where the number of PRBs is 2 and RIV=10 where the number of PRBs is 3 and a combination of RIV=7 where the number of PRBs is 2 and RIV=11 where the number of PRBs is 3 are each composed of PRBs that do not overlap, so that they can be simultaneously assigned. Further, these combinations each have an interval of 4 or 3 PRBs between the ends of each assignment, depending on the PRB to which the MPDCCH is allocated, thus achieving an assignment with a high frequency diversity effect. That is, these are assignments that maximize the frequency diversity effect in a case where an assignment in which the number of PRBs is 2 and an assignment in which the number of PRBs is 3 are simultaneously used.

Example Operation 2-1: Number of Bits 3. Case of Cross-Subframe Scheduling

In a case where the MPDCCH and the PDSCH are allocated to different subframes (cross-subframe scheduling), all assignment patterns cannot be covered for six PRBs with three bits, so that assignment patterns of resources are limited.

FIG. 19 shows an example of a relationship between the RIV and the resource assignment to the PDSCH in a case where the MPDCCH and the PDSCH are allocated to different subframes. The assignment patterns shown in FIG. 19 are assignment patterns with emphasis on localized assignment.

The resource assignment shown in FIG. 19 includes the following features:

(1) As assignments in which the numbers of PRBs are 1, 2, and 3 (RIV=0 to 5), two assignments are included for each number of PRBs, and assignments of the same number of PRBs are each composed of PRBs that do not overlap, so that they can be simultaneously assigned.

(2) At RIV=0 and 1 where the number of PRBs is 1, one out of the six PRBs of the narrowband is assigned. This one PRB which is assigned is not limited to PRB #0 or PRB #4, but may be uniquely determined, for example, from C-RNTI (ID of the terminal (UE)) and the subframe number.

(3) At RIV=2 and 3 where the number of PRBs is 2, it is possible to perform the same assignment as an RBG-by-RBG assignment in which the RBG size is 2.

(4) At RIV=4 and 5 where the number of PRBs is 3, it is possible to perform the same assignment as an RBG-by-RBG assignment in which the RBG size is 3.

(5) At RIV=6 where the number of PRBs is 4, it is possible to perform the same assignment as an RBG-by-RBG assignment in which the RBG size is 4. Note, however, that since different PRBs within the narrowband can be included in the RBG, depending on the allocation of the narrowband within the system band, different PRBs are assigned by the same assignment as the RBG-by-RBG assignment at RIV=6.

(6) The example shown in FIG. 19 does not include an assignment in which the number of PRBs is 5.

Figure 20:
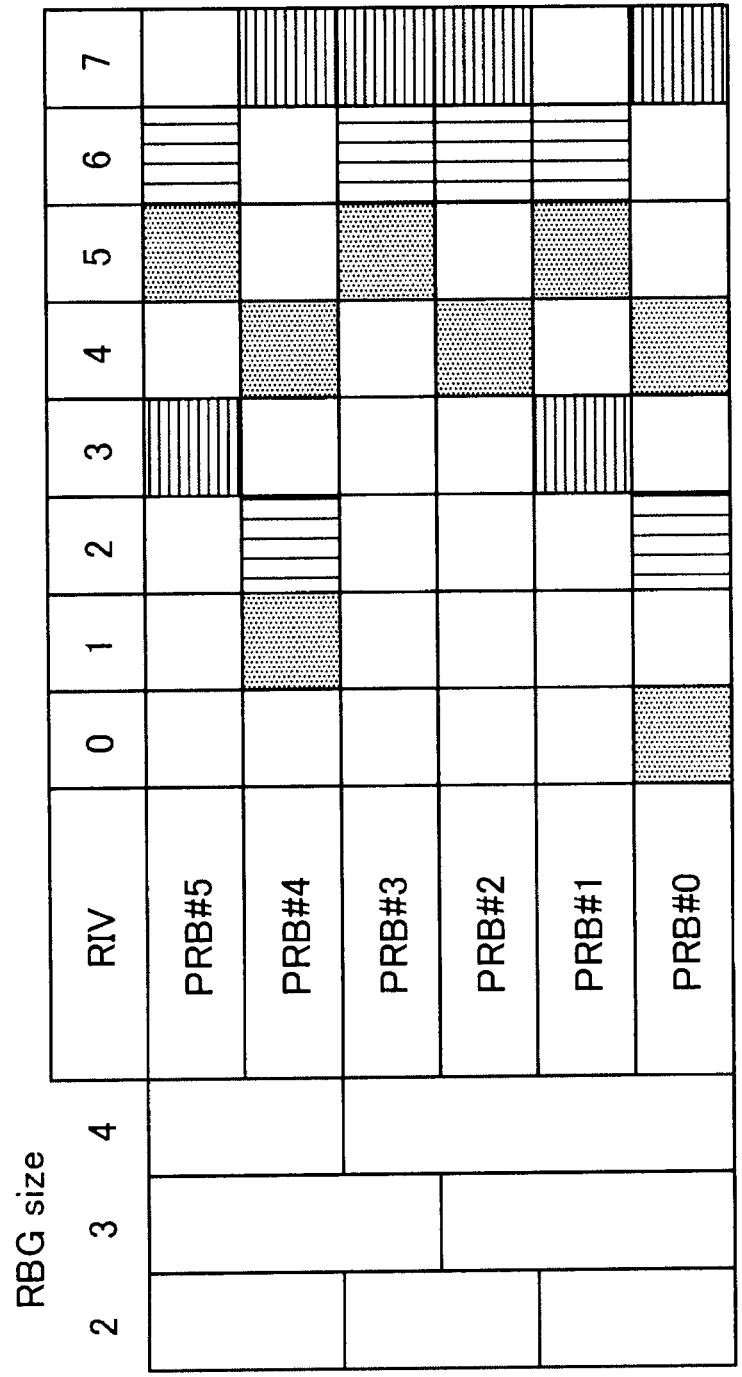
FIG. 20 is a diagram showing an example of 3-bit PDSCH resource assignment at the time of cross-subframe scheduling according to Embodiment 3.

Next, FIG. 20 shows an example of a relationship between the RIV and the resource assignment to the PDSCH in a case where the MPDCCH and the PDSCH are allocated to different subframes. The assignment patterns shown in FIG. 20 are assignment patterns with emphasis on distributed assignment. In FIG. 20, the assignment patterns of RIV=2 to 6, which correspond to a case where the number of PRBs that are targets of assignment is 2 or greater, are different from the assignment patterns shown in FIG. 19.

The resource assignment shown in FIG. 20 includes the following features:

(1) As assignments in which the numbers of PRBs are 1, 2, and 3 (RIV=0 to 5), two assignments are included for each number of PRBs, and assignments of the same number of PRBs are each composed of PRBs that do not overlap, so that they can be simultaneously assigned.

(2) A combination of RIV=2 and 3 where the number of PRBs is 2, a combination of RIV=4 and 5 where the number of PRBs is 3, and a combination of RIV=6 and 7 where the number of PRBs is 4 each have an interval of 5 PRBs between the ends of each assignment, thus achieving an assignment with a high frequency diversity effect. In particular, a combination of RIV=2 and RIV=6 or a combination of RIV=3 and RIV=7 constitutes an assignment that maximizes the frequency diversity effect in a case where each assignment is simultaneously used.

(3) The example shown in FIG. 20 does not include an assignment in which the number of PRBs is 5 or 6.

Example Operation 2-2: Number of Bits 3. Case of Same-Subframe Scheduling

In a case where the MPDCCH and the PDSCH are allocated to the same subframe (same-subframe scheduling), a PRB to which the MPDCCH is allocated is excluded from targets of resource assignment of the PDSCH. For example, in a case where the MPDCCH is allocated to one PRB, the resource assignment to five PRBs are notified by 3 bits of RIV. Further, for example, in a case where the MPDCCH is allocated to two PRBs, the resource assignment to four PRBs are notified by 3 bits of RIV. Note here that in a case where the MPDCCH is allocated to three or more PRBs, the resources to which the PDSCH is assigned are three or less PRBs; therefore, in a case where the resource assignment is notified by 3 bits of RIV, a bitmap can be used as in the case of Embodiment 1.

Figure 21:
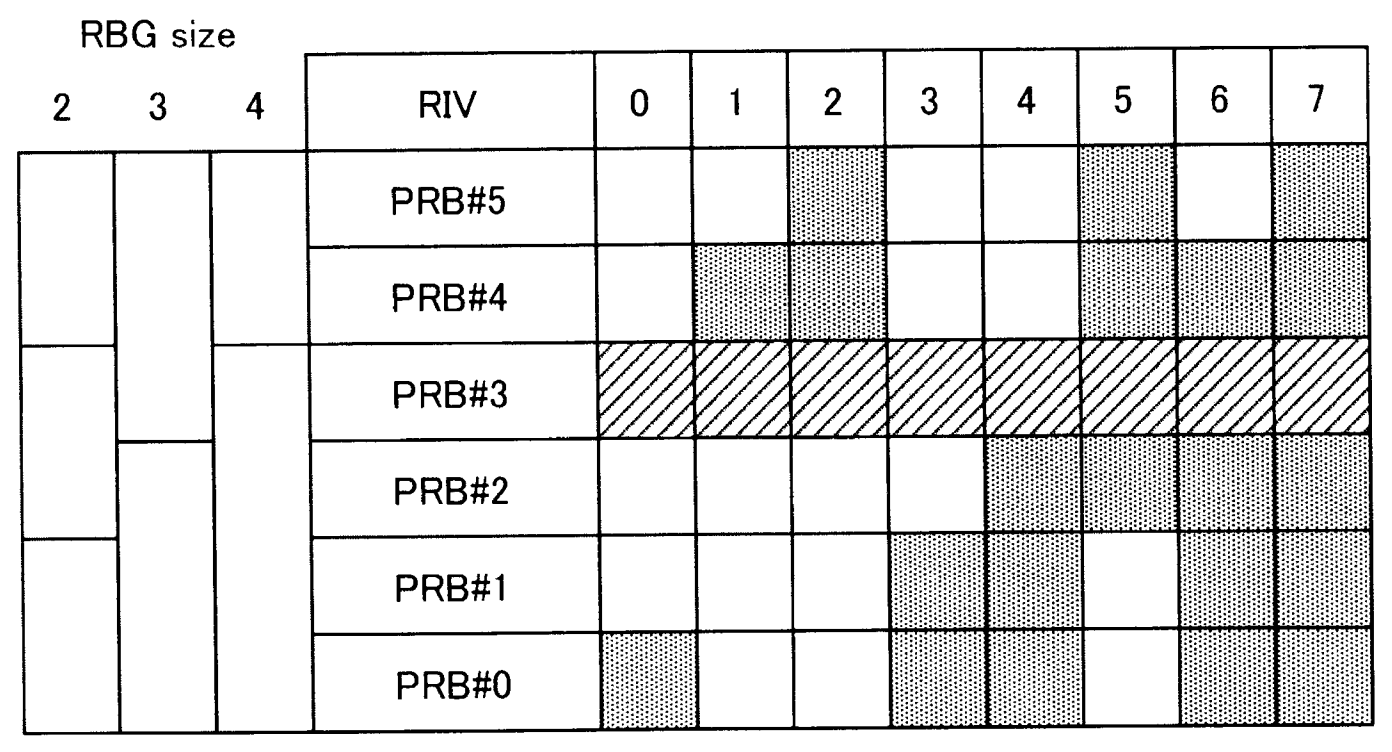
Figure 22:
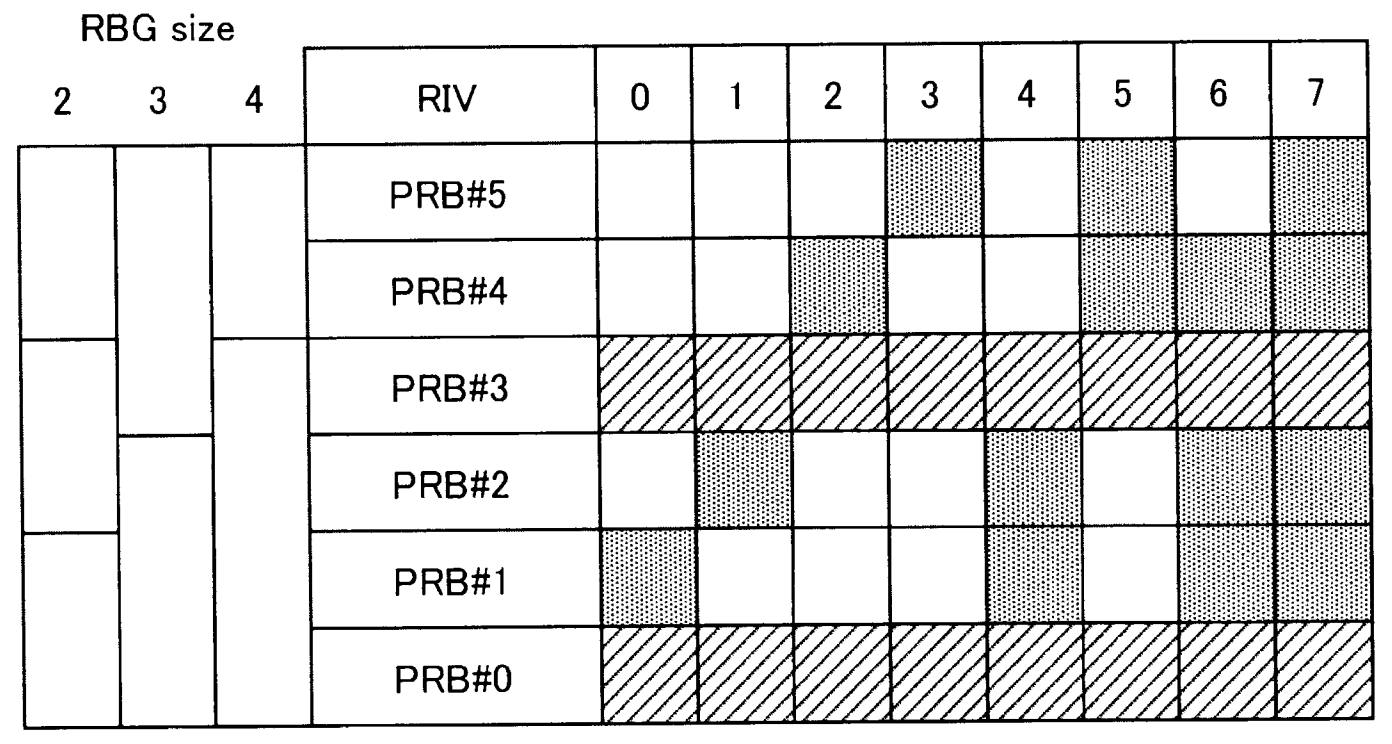

Each of FIGS. 21 and 22 shows an example of a relationship between the RIV and the resource assignment to the PDSCH in a case where the MPDCCH and the PDSCH are allocated to the same subframe. The assignment patterns shown in each of FIGS. 21 and 22 are assignment patterns with emphasis on localized assignment. It should be noted that the PRBs within the narrowband are PRBs #0 to #5, that, in FIG. 21, the MPDCCH, which contains the DL resource assigning control signal for the MTC terminal, is allocated to PRB #3, and that, in FIG. 22, the MPDCCH, which contains the DL resource assigning control signal for the MTC terminal, is allocated to PRB #0 and PRB #3.

The resource assignment shown in FIG. 21 includes the following features:

(1) At RIV=0 and 1 where the number of PRBs is 1, one out of the six PRBs of the narrowband is assigned. This one PRB which is assigned is not limited to PRB #0 or PRB #4, but may be uniquely determined, for example, from C-RNTI (ID of the terminal (UE)) and the subframe number.

(2) At RIV=2 and 3 where the number of PRBs is 2, it is possible to perform the same assignment as an RBG-by-RBG assignment in which the RBG size is 2. Note, however, that since different PRBs within the narrowband can be included in the RBG, depending on the allocation of the narrowband within the system band, different PRBs are assigned by the same assignment as the RBG-by-RBG assignment at RIV=2 and 3.

(3) At RIV=4 and 5 where the number of PRBs is 3, three PRBs are assigned starting from each of the lower and upper ends (PRB #0 and PRB #5) of the narrowband.

(4) At RIV=6 where the number of PRBs is 4, it is possible to perform the same assignment as an RBG-by-RBG assignment in which the RBG size is 4. Note, however, that since different PRBs within the narrowband can be included in the RBG, depending on the allocation of the narrowband within the system band, different PRBs are assigned by the same assignment as the RBG-by-RBG assignment at RIV=6. Note, however, that, depending on the allocation of the MPDCCH, it may be impossible to perform the same assignment as the RBG-by-RBG assignment. FIG. 21 shows an example in which it is impossible to perform the same assignment as the RBG-by-RBG assignment. In this case, four PRBs are assigned starting from each of the lower and upper ends (PRB #0 and PRB #5) of the narrowband (in FIG. 21, four PRBs are assigned starting from the lower end PRB #0).

The resource assignment shown in FIG. 22 includes the following features:

(1) In a case where the number of PRBs is 1 (RIV=0 to 3), all assignment patterns are covered.

(2) At RIV=4 and 5 where the number of PRBs is 2, two PRBs are assigned starting from each of the lower and upper ends (PRB #1 and PRB #5) of the narrowband.

(3) At RIV=6 where the number of PRBs is 3, it is possible to perform the same assignment as an RBG-by-RBG assignment in which the RBG size is 3. Note, however, that since different PRBs within the narrowband can be included in the RBG, depending on the allocation of the narrowband within the system band, different PRBs are assigned by the same assignment as the RBG-by-RBG assignment at RIV=6. Note, however, that, depending on the allocation of the MPDCCH, it may be impossible to perform the same assignment as the RBG-by-RBG assignment. FIG. 22 shows an example in which it is impossible to perform the same assignment as the RBG-by-RBG assignment. Further, in a case where the RBG size is 4, the PRBs to which the MPDCCH is allocated and the PRB(s) to which the PDSCH is allocated may be combined to perform the same assignment as the RBG-by-RBG assignment.

Figure 23:
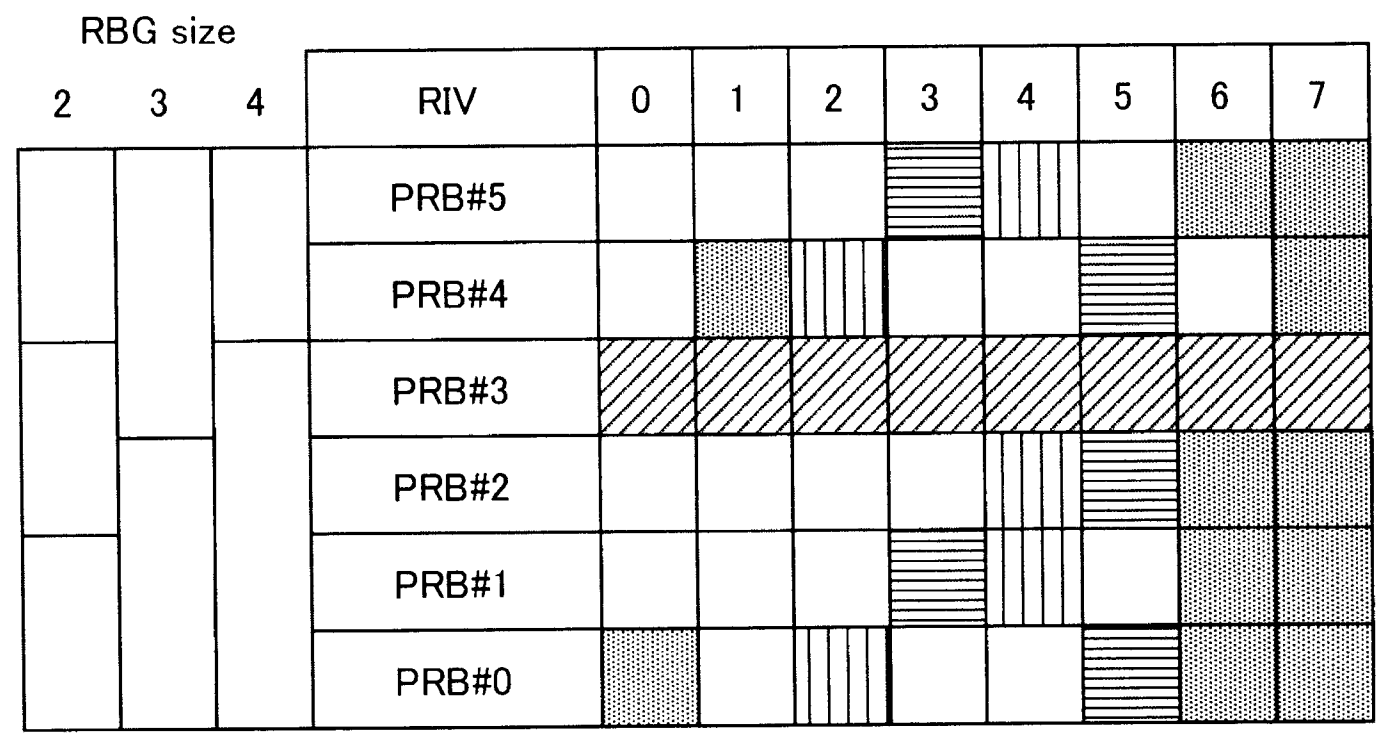
Figure 24:
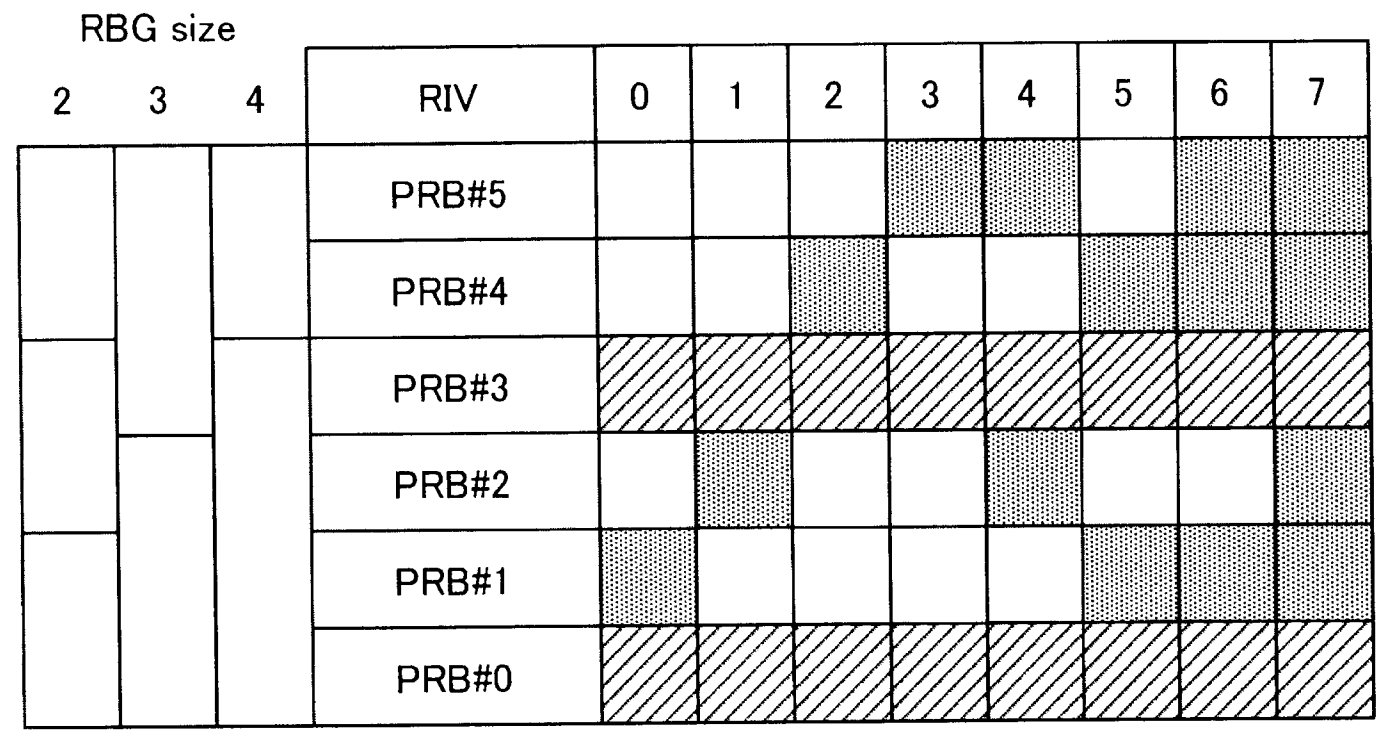

Next, each of FIGS. 23 and 24 shows an example of a relationship between the RIV and the resource assignment to the PDSCH in a case where the MPDCCH and the PDSCH are allocated to the same subframe. The assignment patterns shown in each of FIGS. 23 and 24 are assignment patterns with emphasis on distributed assignment. It should be noted that the PRBs within the narrowband are PRBs #0 to #5, that, in FIG. 23, the MPDCCH, which contains the DL resource assigning control signal for the MTC terminal, is allocated to PRB #3, and that, in FIG. 24, the MPDCCH, which contains the DL resource assigning control signal for the MTC terminal, is allocated to PRB #0 and PRB #3.

The resource assignment shown in FIG. 23 includes the following features:

(1) At RIV=0 and 1 where the number of PRBs is 1, one out of the six PRBs of the narrowband is assigned. This one PRB which is assigned is not limited to PRB #3, but may be uniquely determined, for example, from C-RNTI (ID of the terminal (UE)) and the subframe number.

(2) A combination of RIV=2 where the number of PRBs is 2 and RIV=4 where the number of PRBs is 3 and a combination of RIV=3 where the number of PRBs is 2 and RIV=5 where the number of PRBs is 3 are each composed of PRBs that do not overlap, so that they can be simultaneously assigned. Further, these combinations each have an interval of 5 PRBs between the ends of each assignment, depending on the PRB to which the MPDCCH is allocated, thus achieving an assignment with a high frequency diversity effect. That is, these are assignments that maximize the frequency diversity effect in a case where an assignment in which the number of PRBs is 2 and an assignment in which the number of PRBs is 3 are simultaneously used.

(3) At RIV=6 where the number of PRBs is 4, four out of the five PRBs within the narrowband that can be allocated to the PDSCH excluding one PRB are assigned. This one PRB which is not assigned is not limited to PRB #4 shown in FIG. 23, but may be uniquely determined, for example, from C-RNTI (ID of the terminal (UE)) and the subframe number.

Next, the resource assignment shown in FIG. 24 includes the following features:

(1) In a case where the number of PRBs is 1 (RIV=0 to 3), all assignment patterns are covered.

(2) A combination of RIV=4 and 5 where the number of PRBs is 2 is composed of PRBs that do not overlap, so that they can be simultaneously assigned. This combination constitutes an assignment that maximizes the frequency diversity effect.

(3) At RIV=6 where the number of PRBs is 3, three out of the four PRBs within the narrowband that can be allocated to the PDSCH excluding one PRB are assigned. This one PRB which is not assigned is not limited to PRB #2 shown in FIG. 24, but may be uniquely determined, for example, from C-RNTI (ID of the terminal (UE)) and the subframe number.

The foregoing has described cases where the number of bits (number of bits of the RIV) that are needed for resource assignment within a narrowband is 4 and cases where the number of bits (number of bits of the RIV) that are needed for resource assignment within a narrowband is 3.

Thus, even in a case where the number of bits that are contained in a DL resource assigning control signal is reduced, Embodiment 3, just like Embodiment 1 or 2, allows the base station 100 to notify the terminal 200 of resource assignments suited to the case where the MPDCCH and the PDSCH are allocated to the same subframe and the case where the MPDCCH and the PDSCH are allocated to different subframes, respectively.

Further, as compared with Embodiments 1 and 2, Embodiment 3 further reduces the number of bits that are needed for resource assignment within a narrowband, thus allowing the terminal 200 to require less received power to receive a DL resource assigning control signal and making it possible to expand cell coverage.

Embodiment 4

A base station and a terminal according to Embodiment 4 share common basic components with the base station 100 and the terminal 200 according to Embodiment 1 and, as such, are described with continued reference to FIGS. 3 and 4, respectively.

In Embodiment 4, DCI contains one bit of control information indicating whether an MPDCCH on which a DL resource assigning control signal is mapped and DL data (PDSCH) that is assigned by the DL resource assigning control signal are allocated to the same subframe or allocated to different subframes, the DCI is transmitted from the base station 100 to the terminal 200.

Further, Embodiment 4 assumes that a narrowband is composed of six PRBs.

Further, in Embodiment 4, the resource assignment of the PDSCH by a bitmap is performed in both a case where the MPDCCH and the PDSCH are allocated to different subframes (cross-subframe scheduling) and a case where the MPDCCH and the PDSCH are allocated to the same subframe (same-subframe scheduling).

Accordingly, the number of bits of the RIV that are used to notify the resource assignment to the PDSCH is 6, which is equal to the number of PRBs within the narrowband. This makes it possible to cover all assignment patterns in cross-subframe scheduling, thus bringing about improvement in flexibility of resource assignment.

Meanwhile, since, in a case where the MPDCCH and the PDSCH for the MTC terminal are allocated to the same subframe, the PDSCH for the MTC terminal is not allocated to a PRB to which the MPDCCH is allocated, the PRB to which the MPDCCH is allocated is excluded from targets of assignment of the PDSCH. Accordingly, in same-subframe scheduling, a resource assignment by a bitmap is performed on the PRBs excluding the PRB(s) (at least one PRB) to which the MPDCCH is allocated. This makes it possible to cover all assignment patterns in same-subframe scheduling, too, thus bringing about improvement in flexibility of resource assignment.

Furthermore, in same-subframe scheduling, bits corresponding to the number of PRBs to which the MPDCCH is allocated become unnecessary for the resource assignment of the PDSCH. For example, in a case where the MPDCCH is allocated to one PRB, all assignment patterns can be covered by a 5-bit bitmap for the PDSCH for the MTC terminal. That is, the remaining one of the six bits that are used to notify the resource assignment becomes unnecessary.

In view of this, Embodiment 4 describes a case where another parameter other than the resource assignment of the PDSCH is notified using a bit that is used in cross-subframe scheduling and unneeded in same-subframe scheduling. The following describes, as another parameter, control information indicating whether the precoding of the MPDCCH and the precoding of the PDSCH for the MTC terminal are the same.

There is a case where UL assignment information and DL assignment information intended for a plurality of MTC terminals are assigned to a PRB to which the MPDCCH is allocated. Further, in distributed assignment of the MPDCCH, control signals intended for a plurality of MTC terminals are interleaved and allocated to a plurality of PRBs. Further, even in localized assignment of the MPDCCH, a minimum unit of the MPDCCH is ¼ of a PRB, and control signals intended for a plurality of MTC terminals may be interleaved and allocated to the same PRB. Thus, in a case where a PRB contains control signals intended for a plurality of MTC terminals, it is desirable that such antenna precoding be set that the plurality of MTC terminals easily receive the control signals.

Meanwhile, there is a case where a PRB to which an MPDCCH for one MTC terminal (referred to as "MTC terminal A") is assigned contains no control signal intended for another MTC terminal and only a control signal for the MTC terminal A is allocated to the PRB. Thus, in a case where a PRB contains a control signal for a single MTC terminal, it is desirable that such antenna precoding be set that the MTC terminal easily receives the control signal.

Further, in a case where an MPDCCH designates the assignment of a PDSCH of the same subframe as the subframe to which the MPDCCH is allocated, it is possible to apply the same antenna precoding to the MPDCCH and the PDSCH intended for the same MTC terminal. This allows the MTC terminal to, in receiving the PDSCH, use, as reference signals, the DMRS (demodulation reference signal) of a PRB to which the PDSCH is allocated and the DMRS of a PRB to which the MPDCCH is allocated and perform "PRB bundling" that improves reception quality.

This brings about an advantage of making it possible to improve DMRS reception quality by appropriately switching precoding according to a control signal contained in the MPDCCH. However, the MTC terminal both detects and receives only a control signal addressed thereto and neither detects nor receives a control signal addressed to another terminal. Therefore, the MTC terminal cannot recognize whether a control signal addressed to another terminal is allocated to the same PRB as the PRB to which a control signal addressed to the MTC terminal is assigned.

To address this problem, Embodiment 4 is configured such that the remaining ones of the bits of the RIV excluding a bit indicating the resource assigned to the PDSCH in a case where the MPDCCH and the PDSCH are transmitted in the same subframe indicate whether the same precoding is applied to the MPDCCH and the PDSCH in the subframe.

The base station 100 notifies, by using a bit of the predetermined resource assignment bits (RIV) that is unneeded in the assignment of resources in a case where the MPDCCH and the PDSCH for the MTC terminal are assigned to the same subframe, whether the precoding of the MPDCCH and the precoding of the PDSCH for the MTC terminal are the same. Upon receiving notification that the precoding of the MPDCCH and the precoding of the PDSCH for the MTC terminal are the same, the terminal 200 (MTC terminal) uses, in the demodulation of the PDSCH, the DMRS of the MPDCCH in which the control signal was detected. This brings about improvement in demodulation accuracy at the MTC terminal.

Figure 25:
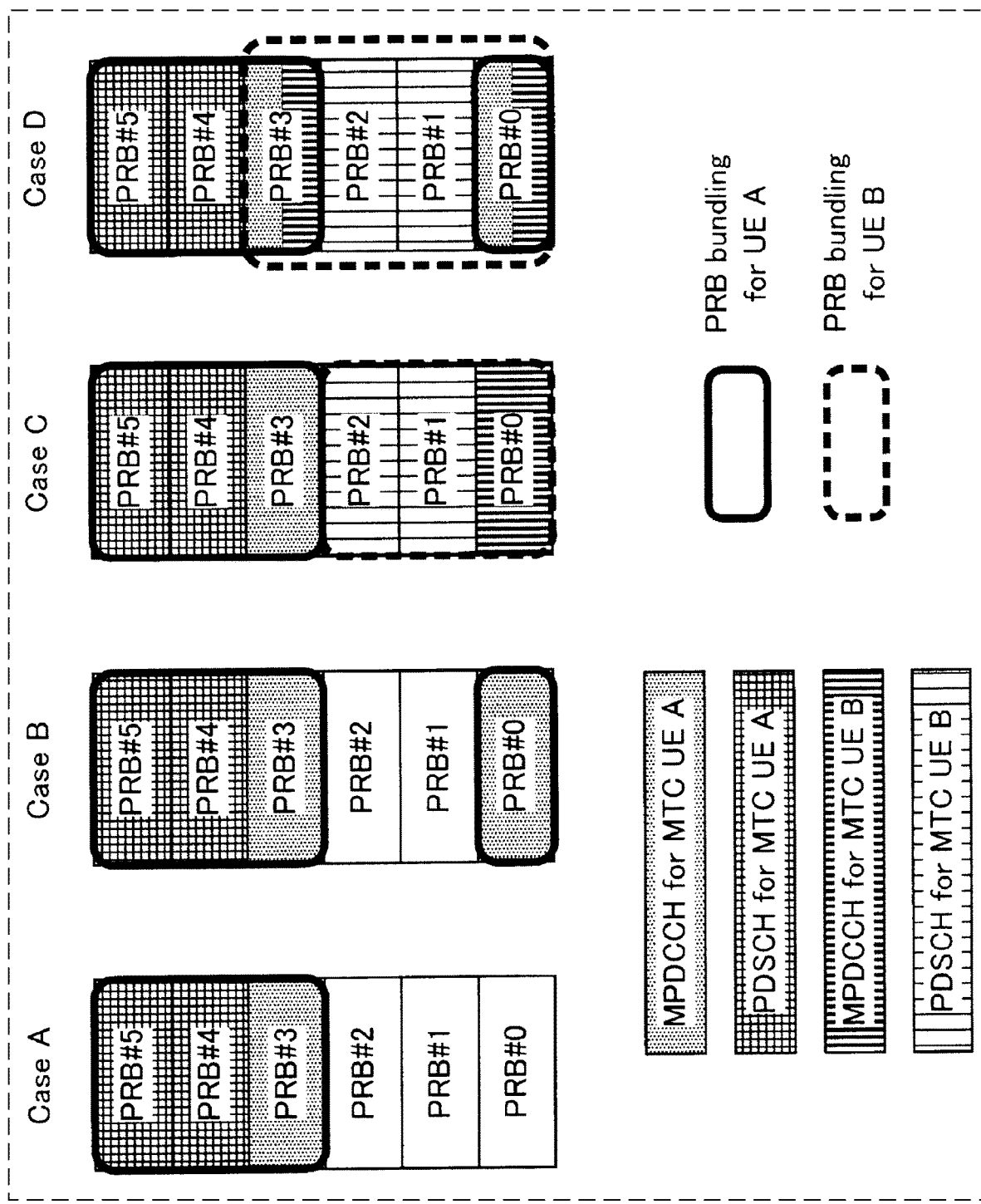
FIG. 25 is a diagram showing an example of PRB bundling according to Embodiment 4.

FIG. 25 shows operation examples of cases of notification that the precoding of an MPDCCH and the precoding of a PDSCH for an MTC terminal are the same. It should be noted that FIG. 25 describes, as an example, two MTC terminals, namely an MTC terminal A (MTC UE A) and an MTC terminal B (MTC UE B).

In Case A shown in FIG. 25, a DL resource assigning control signal (MPDCCH) for the MTC terminal A is detected in PRB #3, and a PDSCH for the MTC terminal A is assigned to PRB #4 and PRB #5. In this case, the MTC terminal A recognizes, through notification from the base station 100, that PRBs #3, 4, and 5 are the same in precoding. That is, the MTC terminal A performs PRB bundling on PRBs #3, 4, and 5.

In Case B shown in FIG. 25, a DL resource assigning control signal (MPDCCH) for the MTC terminal A is detected in PRB #0 and PRB #3, and a PDSCH for the MTC terminal A is assigned to PRB #4 and PRB #5. In this case, the MTC terminal A recognizes, through notification from the base station 100, that PRBs #0, 3, 4, and 5 are the same in precoding, although PRB #0 is away from PRBs #3, 4, and 5. That is, the MTC terminal A performs PRB bundling on PRBs #0, 3, 4, and 5.

In Case C shown in FIG. 25, the assignment for the MTC terminal A is the same as that of Case A, and within the same narrowband, a DL resource assigning control signal (MPDCCH) for the MTC terminal B is detected in PRB #0 and a PDSCH for the MTC terminal B is assigned to PRB #1 and PRB #2. In this case, the MTC terminal B recognizes, through notification of the base station 100, that PRBs #0, 1 and 2 are the same in precoding. That is, the MTC terminal A performs PRB bundling on PRBs #3, 4, and 5, and the MTC terminal B performs PRB bundling on PRBs #0, 1, and 2. It should be noted that since the MTC terminals A and B detect only the assignments of the respective terminals, they do not recognize that resources of another terminal are assigned to the same narrowband.

In Case D shown in FIG. 25, a DL control signal (MPDCCH) for the MTC terminal A and a DL control signal (MPDCCH) for the MTC terminal B are assigned to the same PRBs (PRB #0 and PRB #3) by interleaving, and a PDSCH for the MTC terminal A is assigned to PRBs #5 and 6, and a PDSCH for the MTC terminal B is assigned to PRBs #1 and 2. At this time, in a case where the precoding for the MTC terminal A and the precoding for the MTC terminal B are desired to be different, the base station 100 notifies the MTC terminals A and B that the precodings are different. Meanwhile, in a case where the precoding for the MTC terminal A and the precoding for the MTC terminal B are desired to be the same and the DMRS of the MPDCCH is desired to be used in the demodulation of the PDSCH, the base station 100 notifies the MTC terminals A and B that the precodings are the same.

For example, in a case where a signal addressed to the MTC terminal A and a signal addressed to the MTC terminal B are adjacent to each other and the same precoding is suited or in a case where a precoding with not-so-high directivity is used, the base station 100 sets the same precoding for the MTC terminals A and B. Further, in Case D, the MTC terminal A recognizes that PRBs #0 and 3, in which the MTC terminal A detected a DL resource assigning control signal (MPDCCH), and PRBs #4 and 5, to which the PDSCH was assigned, are the same in precoding. Further, the MTC terminal B recognizes that PRBs #0 and 3, in which the MTC terminal B detected a DL resource assigning control signal (MPDCCH), and PRBs #1 and 2, to which the PDSCH was assigned, are the same in precoding. That is, the MTC terminal A performs PRB bundling on PRBs #0, 3, 4, and 5, and the MTC terminal B performs PRB bundling on PRBs #0, 1, 2, and 3.

Figure 26:
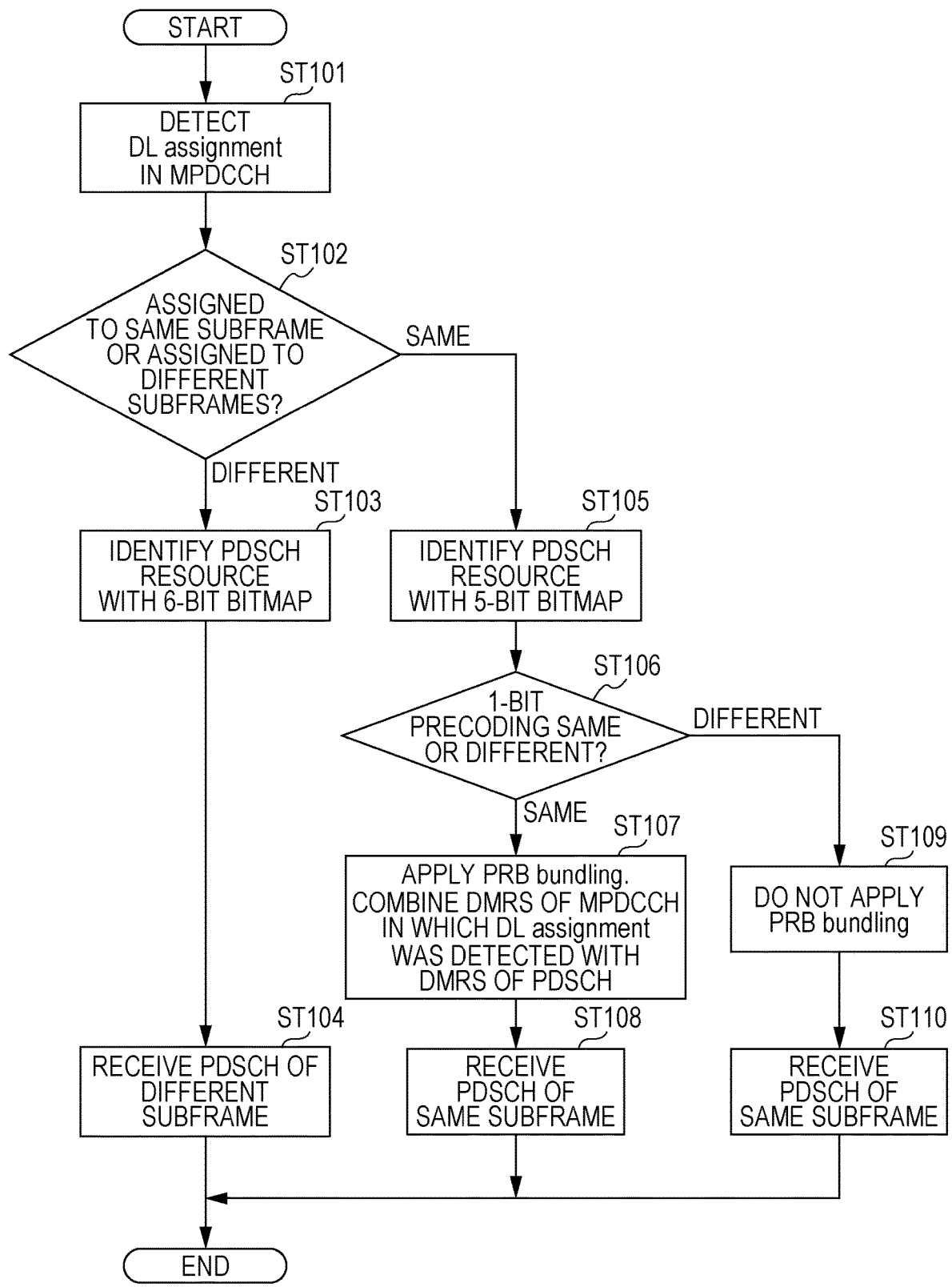
FIG. 26 is a flow chart showing the flow of a process that an MTC terminal performs according to Embodiment 4.

Next, the flow of the aforementioned operation is described. FIG. 26 is a flow chart showing the flow of the process that the terminal 200 performs. It should be noted that the order of steps that the terminal 200 performs is not limited to the order of steps shown in FIG. 26.

As shown in FIG. 26, in step (hereinafter abbreviated as "ST") 101, the terminal 200 detects an MPDCCH addressed thereto and extracts a DL resource assigning control signal (DL assignment) contained in the DCI.

In ST102, the terminal 200 determines, on the basis of control information contained in the DCI of the MPDCCH detected in ST101, whether the MPDCCH and a PDSCH for the terminal 200 are assigned to the same subframe or assigned to different subframes.

In a case where the MPDCCH and the PDSCH are assigned to different subframes, the terminal 200 proceeds to ST103, in which the terminal 200 identifies, on the basis of a 6-bit bitmap, a resource assigned to the PDSCH. In ST104, the terminal 200 receives a PDSCH (DL data) in the resource identified in ST103 of a different subframe from the subframe to which the MPDCCH detected in ST101 is allocated.

Meanwhile, in a case where the MPDCCH and the PDSCH are assigned to the same subframe, the terminal 200 proceeds to ST105, in which the terminal 200 identifies, on the basis of a 5-bit bitmap, a resource assigned to the PDSCH.

In ST106, the terminal 200 determines, on the basis of control information assigned to one bit that is used in the resource assignment of the PDSCH in ST103 and that is not used in the resource assignment of the PDSCH in ST105, whether the precoding of the MPDCCH and the precoding of the PDSCH are the same or different.

In a case where the precoding of the MPDCCH and the precoding of the PDSCH are the same, the terminal 200 proceeds to ST107, in which the terminal 200 applies PRB bundling to the PRBs to which the MPDCCH and the PDSCH are assigned, respectively. That is, the terminal 200 combines the DMRS used in the MPDCCH in which DL assignment was detected in ST101 and the DMRS of the PDSCH assigned to the resource identified in ST105. In ST108, the terminal 200, using the DMRSs combined in ST107, receives the PDSCH in the same subframe as the subframe in which the same MPDCCH was detected.

Meanwhile, in a case where the precoding of the MPDCCH and the precoding of the PDSCH are different, the terminal 200 does not apply PRB bundling (ST109). That is, in ST110, the terminal 200, using the DMRS of the PDSCH assigned to the resource identified in ST105, receives the PDSCH in the same subframe as the subframe in which the same MPDCCH was detected.

Thus, in Embodiment 4, in a case where the MPDCCH and the PDSCH for the MTC terminal are allocated to the same subframe, the base station 100 notifies the terminal 200, by using one bit that is unneeded in the assignment of resources of the PDSCH, whether the precoding of the MPDCCH and the precoding of the PDSCH for the MTC terminal are the same. This allows the terminal 200 to select, for each subframe, whether the MPDCCH and the PDSCH for the MTC terminal are the same or different in precoding.

Further, the control information for notifying whether the MPDCCH and the PDSCH applies the same precoding is notified using a resource assignment bit that is not used in a case where the MPDCCH and the PDSCH are allocated to the same subframe. This allows the base station 100 to notify the control information without newly increasing the amount of information of the DCI.

It should be noted that Embodiment 4 has described a case where, in the presence of notification that the MPDCCH and the PDSCH for the MTC terminal are the same in precoding, the terminal 200 recognizes that the precoding of the DMRS of the PRB to which the MPDCCH in which the DL resource assigning control signal was detected is allocated and the precoding of the DMRS of the PDSCH are equal. In addition to this, the terminal 200 may also recognize that the DMRS of a PRB to which an MPDCCH in which an UL resource assigning control signal was detected is allocated is also equal in precoding. This allows the terminal 200 to combine a larger amount of DMRSs and further improve demodulation accuracy.

Further, in notification of precoding, the base station 100 may notify whether all of the PRBs within a narrowband are the same in precoding. In this case, the terminal 200 recognizes that all of the PRBs within the narrowband, as well as the PRB to which the MPDCCH in which the DL resource assigning control signal addressed to the terminal 200 was detected is allocated, are equal in precoding. With this, the DMRS of a PRB assigned to another MTC terminal can be used for demodulation, so that demodulation accuracy can be further improved. In particular, this is effective in a case where MTC terminals to which the base station 100 can make transmissions with the same precoding can be assigned to the same narrowband.

Further, although the case has been described where, in notification of precoding, whether the precoding of the MPDCCH and the precoding of the DMRS of the PDSCH are the same is notified, whether the precoding of the DMRS and the precoding of a CRS are the same may be notified. This allows the terminal 200 to also use the CRS for demodulation and further improve demodulation accuracy.

Further, in Embodiment 4, six bits are used in the resource assignment of the PDSCH in a case where the MPDCCH and the PDSCH are allocated to different subframes, five bits are used in the resource assignment of the PDSCH in a case where the MPDCCH and the PDSCH are allocated to the same subframe, and in a case where the MPDCCH and the PDSCH are allocated to the same subframe, information regarding precoding was notified by one bit that is not used in the resource assignment of the PDSCH. However, the number of bits is not limited to these. For example, the number of bits that are used in the resource assignment of the PDSCH in a case where the MPDCCH and the PDSCH are allocated to different subframes is larger than the number of bits that are used in the resource assignment of the PDSCH in a case where the MPDCCH and the PDSCH are allocated to the same subframe, the base station 100 can notify precoding by a bit that is not used in the resource assignment of the PDSCH in a case where the MPDCCH and the PDSCH are allocated to the same subframe.

Further, as described in Embodiments 1 to 3, in a case where the MPDCCH and the PDSCH are allocated to the same subframe, an increase in the number of PRBs to which the MPDCCH is allocated leads to a decrease in the number of bits that are needed in the resource assignment of the PDSCH. Accordingly, in a case where the number of PRBs to which the MPDCCH is assigned increases and a bit that is not used in the resource assignment of the PDSCH is present, the base station 100 may notify precoding by a bit that is not used in a case where the MPDCCH and the PDSCH are allocated to the same subframe.

Further, in Embodiment 4, precoding information indicating whether the precoding of the MPDCCH and the precoding of the PDSCH for the MTC terminal are the same is notified using one bit that is unneeded in the resource assignment of the PDSCH in a case where the MPDCCH and the PDSCH for the MTC terminal are allocated to the same subframe. On the other hand, in a case where DCI contains narrowband assignment information, the narrowband assignment information may contain precoding information.

For example, the narrowband assignment information may contain the following settings:
(1) Narrowband position
(2) Whether the MPDCCH and the PDSCH for the MTC terminal are assigned to the same subframe
(3) Whether the precodings are the same FIG. 27 shows an example of narrowband assignment information (Narrowband indication field in DCI) contained in DCI. In the example shown in FIG. 27, three bits (eight patterns) are set as the narrowband assignment information in the DCI.

In Narrowband position, a narrowband (the last MPDCCH) that is the same as the last subframe of the MPDCCH in which the DL resource assignment was detected or any of the other narrowbands (in FIG. 27, x, y, z, w, a, and b) is designated. A reason for the last subframe here is a possibility of frequency hopping of the MPDCCH. Information indicating whether the precoding is the same is information that is needed only in the case of assignment to the same subframe (i.e. the case of Scheduled frame with MPDCCH: same subframe). In FIG. 27, the precoding is set to be the same only when Narrowband indication field in DCI is "0".

This eliminates the need to separately prepare one bit for the assignment of precoding regardless of whether the MPDCCH and the PDSCH for the MTC terminal are assigned to the same subframe, thus making it possible to reduce the number of bits of the whole DCI.

The foregoing has described embodiments of the present disclosure.

It should be noted that Embodiments 1 to 3 have described a case where the resources to be assigned can be changed according to the relationship between the narrowband and the RBG so that the resources of the PDSCH are assigned on an RBG-by-RBG basis in a case where the RBG size is 2, 3, or 4. In so doing, resource assignments at some RIVs may be changed to assignments subjected to a cyclic shift within the narrowband according to the RBG.

Figure 28:
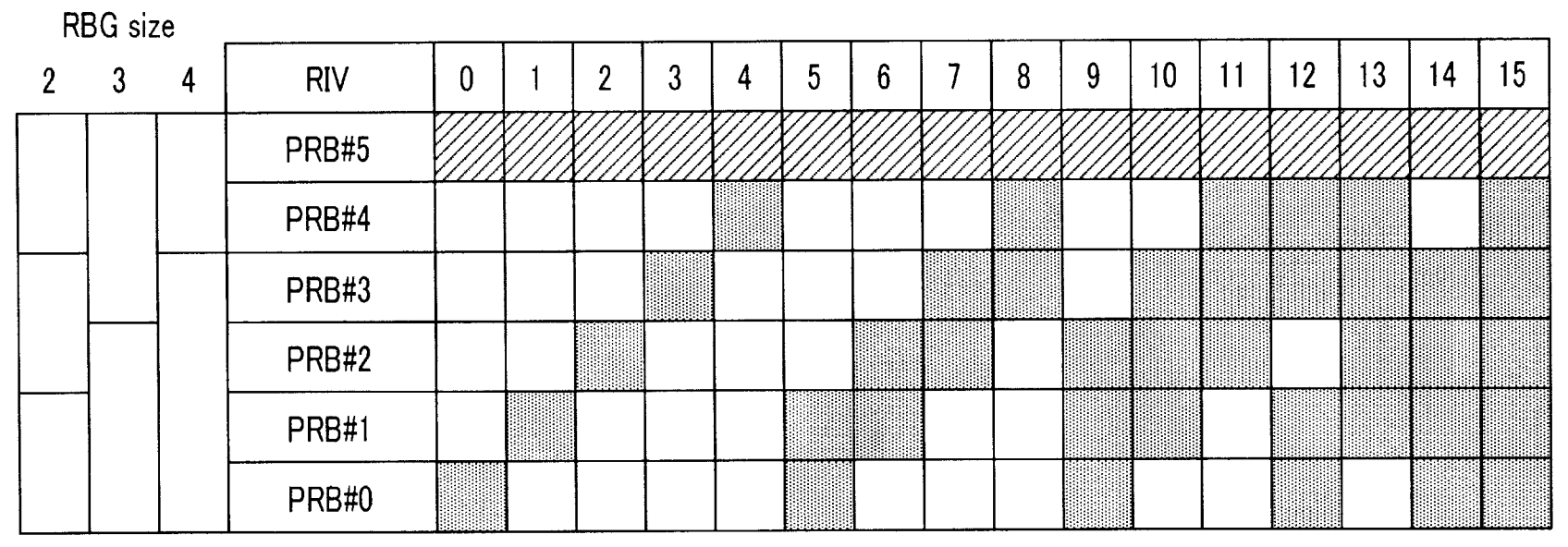

Further, in Embodiments 1 to 3, the resource assignment of the narrowband may be determined regardless of the relationship between the narrowband and the RBG. In this case, the PDSCH is first assigned to theoretically contiguous RBs excluding the PRB to which the MPDCCH is allocated, and then the RBs are physically mapped onto PRBs that are actually used. For example, in the assignment shown in FIG. 17, the MPDCCH is allocated to PRB #3, and in FIG. 28, the MPDCCH is allocated to PRB #5. Note, however, that FIGS. 17 and 28 share common assignments to five theoretically contiguous PRBs with each other.

Further, while each embodiment has been described above by taking, as an example, a case where an aspect of the present disclosure is configured by hardware, the present disclosure can also be realized by software in cooperation with hardware.

Further, each functional block used in the description of each embodiment described above can be typically realized by an LSI such as an integrated circuit. Further, the integrated circuit may control each functional block used in the description of each embodiment described above and include an input and an output coupled thereto. These LSIs may be individually formed as one chip, or one chip may be formed so as to include a part or all of the functional blocks. The LSI here may be referred to as an IC (integrated circuit), a system LSI, a super LSI, or an ultra LSI depending on a difference in the degree of integration.

However, the technique of implementing an integrated circuit is not limited to the LSI and may be realized by using a dedicated circuit or a general-purpose processor. In addition, an FPGA (Field Programmable Gate Array) that can be programmed after the manufacture of the LSI or a reconfigurable processor in which the connections and the settings of circuit cells disposed inside the LSI can be reconfigured may be used.

If future integrated circuit technology replaces LSIs as a result of the advancement of semiconductor technology or other derivative technology, the functional blocks could be integrated using the future integrated circuit technology. Biotechnology can also be applied.

A base station of the present disclosure includes: control circuitry that determines a resource for a PDSCH (physical downlink shared channel) intended for an MTC (Machine-Type Communication) terminal; and a transmitter that transmits an MPDCCH that includes resource assignment bits indicating the determined resource and transmits the PDSCH using the determined resource. The MPDCCH is a PDCCH (physical downlink control channel) intended for the MTC terminal. In the base station, the resource assignment bits are associated with a resource that is used when the MPDCCH and the PDSCH are transmitted in a single subframe and a resource that is used when the MPDCCH and the PDSCH are transmitted in different subframes.

In the base station of the present disclosure, the transmitter further transmits control information indicating whether the MPDCCH and the PDSCH are transmitted in the single subframe or transmitted in the different subframes.

In the base station of the present disclosure, a same value of the resource assignment bits is associated with a resource that is used when the MPDCCH and the PDSCH are transmitted in a single subframe and a resource that is used when the MPDCCH and the PDSCH are transmitted in the different subframes.

In the base station of the present disclosure, when a number of remaining resources other than a resource to which the MPDCCH is allocated is equal to or less than a number of the resource assignment bits in a case where the MPDCCH and the PDSCH are transmitted in the same subframe, each bit of the resource assignment bits is bit-mapped information that indicates the presence or absence of an assignment to a corresponding one of the remaining resources.

In the base station of the present disclosure, the resource assignment bits include a bit associated with a resource that is used when the MPDCCH and the PDSCH are transmitted in the same subframe and a bit associated with a resource that is used when the MPDCCH and the PDSCH are transmitted in different subframes.

In the base station of the present disclosure, the number of bits of the resource assignment bits is equal to the number of resources that are targets of assignment in a case where the MPDCCH and the PDSCH are transmitted in different subframes, and of the resource assignment bits, a remaining bit other than a bit indicating the resource determined in a case where the MPDCCH and the PDSCH are transmitted in the same subframe indicates whether the same precoding is applied to the MPDCCH and the PDSCH in the subframe.

A terminal of the present disclosure includes: a receiver that receives an MPDCCH that includes resource assignment bits indicating a resource assigned to a PDSCH (physical downlink shared channel) intended for an MTC (Machine-Type Communication) terminal, the MPDCCH being a PDCCH (physical downlink control channel) intended for the MTC terminal; and a signal separator that separates the PDSCH from a received signal using the resource indicated by the resource assignment bits. In the terminal, the resource assignment bits are associated with a resource that is used when the MPDCCH and the PDSCH are transmitted in a single subframe and a resource that is used when the MPDCCH and the PDSCH are transmitted in different subframes.

A transmission method of the present disclosure includes: determining a resource for a PDSCH (physical downlink shared channel) intended for an MTC (Machine-Type Communication) terminal; and transmitting an MPDCCH that includes resource assignment bits indicating the determined resource and transmitting the PDSCH using the determined resource. The MPDCCH being a PDCCH (physical downlink control channel) intended for the MTC terminal. In the transmission method, the resource assignment bits are associated with a resource that is used when the MPDCCH and the PDSCH are transmitted in a single subframe and a resource that is used when the MPDCCH and the PDSCH are transmitted in different subframes.

A reception method of the present disclosure includes: receiving an MPDCCH that includes resource assignment bits indicating a resource assigned to a PDSCH (physical downlink shared channel) intended for an MTC (Machine-Type Communication) terminal, the MPDCCH being a PDCCH (physical downlink control channel) intended for the MTC terminal; and separating the PDSCH from a received signal using the resource indicated by the resource assignment bits. In the reception method, the resource assignment bits are associated with a resource that is used when the MPDCCH and the PDSCH are transmitted in a single subframe and a resource that is used when the MPDCCH and the PDSCH are transmitted in different subframes.

An aspect of the present disclosure is useful in a mobile communication system.

What is claimed is:

1. A base station comprising:
control circuitry, which, in operation, determines a resource from available Physical Resource Blocks (PRBs) for a PDSCH (physical downlink shared channel) in narrowbands; and
a transmitter, which, in operation, transmits a PDCCH (physical downlink control channel) that includes resource assignment bits indicating the determined resource and transmits the PDSCH using the determined resource,
wherein,
the resource assignment bits indicate both a localized assignment and a distributed assignment; and
interpretation of the resource assignment bits is varied according to a number of the available PRBs.

2. The base station according to claim 1, wherein the distributed assignment includes assignment of the resource in units of a Resource Block Group (RBG) size of 1RB and 2RB.

3. The base station according to claim 1, wherein the resource assignment bits indicate assignment of the resource in units of 1RB for each of six PRBs.

4. The base station according to claim 1, wherein the PDCCH is a MPDCCH (machine-communications type PDCCH).

5. The base station according to claim 1, wherein the resource assignment bits indicate a narrowband including the resource.

6. The base station according to claim 5, wherein the resource assignment bits indicate a position of the narrowband.

7. A transmission method comprising:
determining a resource from available Physical Resource Blocks (PRBs) for a PDSCH (physical downlink shared channel) in narrowbands; and
transmitting a PDCCH (physical downlink control channel) that includes resource assignment bits indicating the determined resource and transmitting the PDSCH using the determined resource,
wherein,
the resource assignment bits indicate both a localized assignment and a distributed assignment; and
interpretation of the resource assignment bits is varied according to a number of the available PRBs.

8. The transmission method according to claim 7, wherein the distributed assignment includes assignment of the resource in units of a Resource Block Group (RBG) size of 1RB and 2RB.

9. The transmission method according to claim 7, wherein the resource assignment bits indicate assignment of the resource in units of 1RB for each of six PRBs.

10. The transmission method according to claim 7, wherein the PDCCH is a MPDCCH (machine-communications type PDCCH).

11. The transmission method according to claim 7, wherein the resource assignment bits indicate a narrowband including the resource.

12. The transmission method according to claim 11, wherein the resource assignment bits indicate a position of the narrowband.

13. An user equipment comprising:
a receiver, which, in operation,
receives a PDSCH (physical downlink shared channel) transmitted using a resource, the resource being part of available Physical Resource Blocks (PRBs); and
receives a PDCCH (physical downlink control channel) that includes resource assignment bits indicating the resource used to transmit the PDSCH; and
control circuitry, which, in operation, decodes the PDSCH,
wherein,
the resource assignment bits are associated with both of a localized assignment and a distributed assignment, and
interpretation of the resource assignment bits is varied according to a number of the available PRBs.

14. The user equipment according to claim 13, wherein the distributed assignment includes assignment of the resource in units of a Resource Block Group (RBG) size of 1RB and 2RB.

15. The user equipment according to claim 13, wherein the resource assignment bits indicate assignment of the resource in units of 1RB for each of six PRBs.

16. The user equipment according to claim 13, wherein the PDCCH is a MPDCCH (machine-communications type PDCCH).

17. The user equipment according to claim 13, wherein the resource assignment bits indicate a narrowband including the resource.

18. The user equipment according to claim 17, wherein the resource assignment bits indicate a position of the narrowband.

* * * * *